US 11,513,389 B2

(12) United States Patent
Yamashita et al.

(10) Patent No.: US 11,513,389 B2
(45) Date of Patent: *Nov. 29, 2022

(54) LIGHT EMITTING MODULE

(71) Applicant: NICHIA CORPORATION, Anan (JP)

(72) Inventors: Ryohei Yamashita, Tokushima (JP);
Toshinobu Katsumata, Anan (JP)

(73) Assignee: NICHIA CORPORATION, Anan (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/110,676

(22) Filed: Dec. 3, 2020

(65) Prior Publication Data

US 2021/0088851 A1    Mar. 25, 2021

Related U.S. Application Data

(63) Continuation of application No. 16/807,965, filed on Mar. 3, 2020, now Pat. No. 10,884,290.

(30) Foreign Application Priority Data

Mar. 5, 2019    (JP) .............................. JP2019-039776

(51) Int. Cl.
*G02F 1/13357*    (2006.01)
*F21V 8/00*    (2006.01)

(52) U.S. Cl.
CPC ..... *G02F 1/133606* (2013.01); *G02B 6/0078* (2013.01); *G02F 1/133603* (2013.01)

(58) Field of Classification Search
CPC ......... G02F 1/133606; G02F 1/133605; G02B 6/0078; G02B 6/0073; G02B 6/0061; G02B 6/0021; G02B 6/0036
See application file for complete search history.

(56) References Cited

U.S. PATENT DOCUMENTS

| 8,917,962 B1 | 12/2014 | Nichol et al. |
| 2005/0265029 A1 | 12/2005 | Epstein et al. |
| 2009/0059125 A1 | 3/2009 | Nagayoshi et al. |

(Continued)

FOREIGN PATENT DOCUMENTS

| JP | 2007005111 A | 1/2007 |
| JP | 2007329114 A | 12/2007 |

(Continued)

OTHER PUBLICATIONS

United States Patent and Trademark Office, Ex-Parte Quayle Action issued to U.S. Appl. No. 16/807,965 on Jun. 26, 2020, 5 pages.

*Primary Examiner* — Anabel Ton

(74) *Attorney, Agent, or Firm* — Hunton Andrews Kurth LLP

(57) ABSTRACT

A light emitting module according to one embodiment of the present disclosure includes a lightguide plate having an upper surface in which a first hole is defined, and a lower surface opposite to the upper surface; and a light emitting element on a lower surface side of the lightguide plate, the light emitting element facing the first hole. The upper surface of the lightguide plate includes a first region defining a plurality of protrusions and/or recesses. A ratio of an area occupied by the plurality of protrusions and/or recesses per unit area in a plan view increases concentrically in an outward direction from the light emitting element.

16 Claims, 12 Drawing Sheets

(56) References Cited

U.S. PATENT DOCUMENTS

| | | |
|---|---|---|
| 2010/0008628 A1 | 1/2010 | Shani |
| 2011/0037740 A1 | 2/2011 | Yamaguchi |
| 2011/0062469 A1 | 3/2011 | Camras et al. |
| 2011/0194034 A1 | 8/2011 | Shimizu |
| 2015/0117057 A1 | 4/2015 | Chen et al. |
| 2015/0378214 A1 | 12/2015 | Tran et al. |
| 2016/0005920 A1* | 1/2016 | Keller ............... H01L 25/0753 362/231 |
| 2018/0239193 A1 | 8/2018 | Hayashi |
| 2019/0049649 A1 | 2/2019 | Hayashi et al. |
| 2019/0324327 A1* | 10/2019 | Moon ............... G02F 1/133608 |
| 2020/0049876 A1 | 2/2020 | Watanabe et al. |
| 2020/0049877 A1 | 2/2020 | Watanabe et al. |
| 2020/0285114 A1 | 9/2020 | Yamashita et al. |

FOREIGN PATENT DOCUMENTS

| | | |
|---|---|---|
| JP | 2009063684 A | 3/2009 |
| JP | 2009150940 A | 7/2009 |
| JP | 2009157115 A | 7/2009 |
| JP | 2009289701 A | 12/2009 |
| JP | 2010040192 A | 2/2010 |
| JP | 2011039122 A | 2/2011 |
| JP | 2012216437 A | 11/2012 |
| JP | 2018097974 A | 6/2018 |
| JP | 2018101521 A | 6/2018 |
| JP | 2018133304 A | 8/2018 |
| JP | 2019012681 A | 1/2019 |
| KR | 20090117419 A | 11/2009 |
| TW | 201121105 A | 6/2011 |
| WO | 2010058625 A1 | 5/2010 |
| WO | 2010070885 A1 | 6/2010 |

* cited by examiner

LIGHT EMITTING MODULE

CROSS REFERENCE TO RELATED APPLICATION

This is a continuation application of U.S. patent application Ser. No. 16/807,965, filed Mar. 3, 2020, which claims priority to Japanese Patent Application No. 2019-039776, filed on Mar. 5, 2019, the disclosures of which are hereby incorporated by reference in their entirety.

BACKGROUND

The present disclosure relates to a light emitting module.

A backlight device including a plurality of backlight units each including a lightguide plate is described in, for example, Japanese Patent Publication No. 2009-150940. The lightguide plate of each of the backlight units defines a recess in a central portion of the lightguide plate at a side opposite to a light-emission side, and an LED is disposed in the recess. The plurality of backlight units are arranged such that emission surfaces of the lightguide plates are in the same plane, and thus form the backlight device as an entirety. According to the technology described in Japanese Patent Publication No. 2009-150940, an optical sheet including a plurality of lens portions is located on an emission surface side of the lightguide plate of each of the backlight units, and a light-reflective layer having a plurality of openings is disposed between the lens portions and the lightguide plate. Such a structure allows for improving uniformity in light emission. Japanese Patent Publication No. 2009-150940 also describes that the lens portions with different sizes are arranged such that a size of the lens portions increases in an outward direction from the LED in a plan view.

An optical unit including a plurality of optical elements disposed at an upper-surface side of a plurality of LEDs arranged on a substrate is described in, for example, Japanese Patent Publication No. 2009-063684. In this optical unit, each of the plurality of LEDs is located in a hole formed in a surface, opposite to an emission surface, of a corresponding one of the optical elements. In the optical unit described in Japanese Patent Publication No. 2009-063684, the emission surface of each optical element defines a recess directly above the LED, and a lens array is disposed on each optical element so as to surround a central portion, where the recess is defined, of the emission surface. Japanese Patent Publication No. 2009-063684 describes that a light-diffusive portion, a light-reflective portion or a light-blocking portion may be disposed in the recess.

SUMMARY

It is advantageous to further reduce the thickness of a light emitting module including a plurality of light sources such as LEDs or the like while reducing the unevenness in luminance. Such reduction in thickness of the light emitting module further allows for decreasing the size of a device including, for example, the light emitting module as a backlight unit.

A light emitting module according to one embodiment of the present disclosure includes a lightguide plate having an upper surface in which a first hole is defined, and a lower surface opposite to the upper surface; and a light emitting element on a lower surface side of the lightguide plate, the light emitting element facing the first hole. The upper surface of the lightguide plate includes a first region defining a plurality of protrusions and/or recesses. A ratio of an area occupied by the plurality of protrusions and/or recesses per unit area in a plan view increases concentrically in an outward direction from the light emitting element.

According to certain embodiments of the present disclosure, a light emitting module with a reduced thickness and improved light uniformity can be provided.

DETAILED DESCRIPTION

Certain embodiments of the present disclosure will now be described in detail with reference to the drawings. The embodiments described below are illustrative, and the light emitting module according to the present disclosure are not limited thereto. For example, the numerical values, shapes, materials, steps, and the order of steps, etc., to be shown in the embodiments described below are examples, and various modifications can be made thereto so long as they do not lead to technical contradictions. The embodiments described below are examples, and may be combined in various manners as long as any technological contradiction occurs.

The size, the shape, etc., of the components shown in the figures may be exaggerated for ease of understanding, and they may not represent the size and the shape of the components, the size relationship therebetween in an actual light emitting module. Illustration of some components may be omitted in order to prevent the figures from becoming excessively complicated.

In the following description, components of like functions may be denoted by like reference signs and may not be described redundantly. Terms indicating specific directions and positions (e.g., "upper", "lower", "right", "left", and other terms including such terms) may be used in the description below. These terms are used merely for the ease of understanding relative directions or positions in the figure being referred to. The arrangement of components in figures from documents other than the present disclosure, actual products, actual manufacturing apparatuses, etc., may not be equal to that shown in the figure being referred to, as long as it conforms with the directional or positional relationship as indicated by terms such as "upper" and "lower" in the figure being referred to. In the present disclosure, the term "parallel" encompasses cases where two straight lines, sides, planes, etc., are in the range of about 0±5°, unless otherwise specified. In the present disclosure, the term "perpendicular" or "orthogonal" encompasses cases where two straight lines, sides, planes, etc., are in the range of about 90±5°, unless otherwise specified.

Embodiment of a Surface-Emitting Light Source

Figure 1:
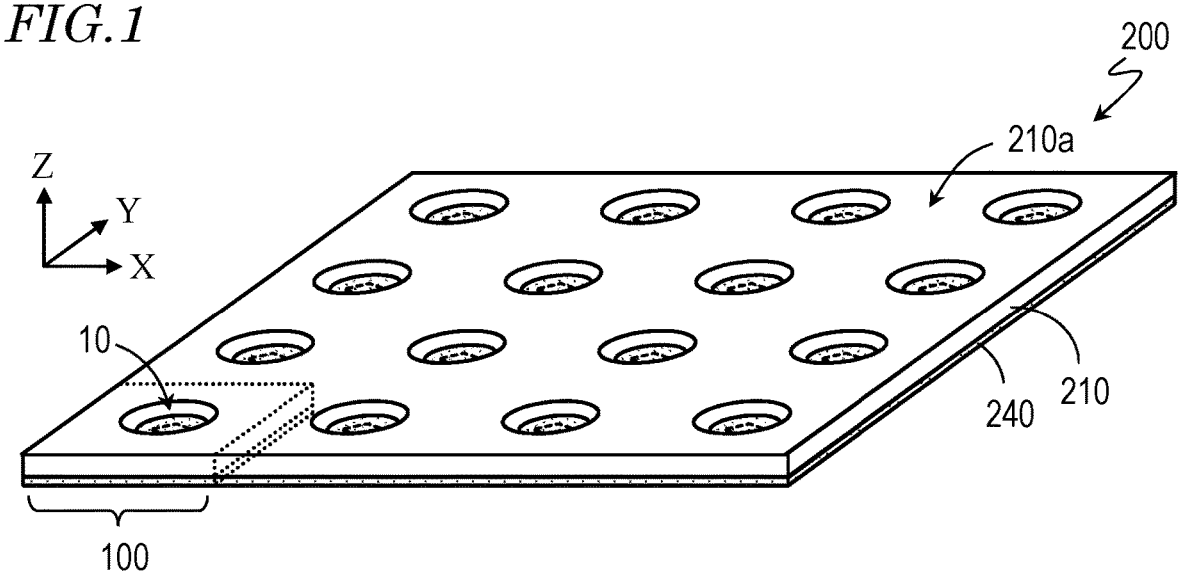
FIG. 1 is a schematic perspective view showing an example of configuration of a surface-emitting light source according to an embodiment of the present disclosure.

FIG. 1 shows an example of configuration of a surface-emitting light source according to one embodiment of the present disclosure. The surface-emitting light source 200 shown in FIG. 1 includes a lightguide plate 210 having an upper surface 210a and a layer-shaped light-reflective member 240 located below the lightguide plate 210. FIG. 1 also shows arrows representing an X direction, a Y direction and a Z direction perpendicular to each other for the convenience of description. Arrows representing these directions may be shown in the other figures of the present disclosure.

The surface-emitting light source 200 has a plate shape as an entirety. The upper surface 210a of the lightguide plate 210 forms an emission surface of the surface-emitting light source 200, and typically has a rectangular shape. In this example, the X direction and the Y direction mentioned above coincide two sides of the rectangular lightguide plate 210 perpendicular to each other. Each of the sides of the rectangular upper surface 210a has a length in the range of, for example, 1 to 200 cm. In one embodiment of the present disclosure, each of the sides of the rectangular upper surface 210a of the lightguide plate 210 has a length of 20 mm or longer and 25 mm or shorter. The rectangular upper surface 210a may have a length of 24.3 mm in one of the X direction and the Y direction and a length of 21.5 mm in the other of the X direction and the Y direction.

In the configuration shown in FIG. 1, the surface-emitting light source 200 is a collective body of a plurality of light emitting modules 100 each including at least one light emitting element. As schematically shown in FIG. 1, in this example, the surface-emitting light source 200 includes a total of 16 light emitting modules 100 arranged two-dimensionally. In this example, the 16 light emitting modules 100 are arranged in four rows by four columns. The surface-emitting light source 200 may include any appropriate number of the light emitting modules 100 in any appropriate arrangement, and the number and the arrangement of the light emitting modules 100 other than those shown in FIG. 1 may be employed.

As shown in FIG. 1, each of the light emitting modules 100 defines a first hole 10 having an opening located in the upper surface 210a of the lightguide plate 200. As described below in detail, the light emitting element in the light emitting module 100 is located substantially directly below the first hole 10. In this example, according to arrangement of the light emitting modules 100 in four rows by four columns, the light emitting elements are arranged in four rows by four columns in the X direction and the Y direction. The light emitting elements may be located at a pitch, for example, in a range of about 0.05 to 20 mm, and may be located at a pitch in a range of about 1 to 10 mm. The "pitch" of the light emitting elements as used herein refers to the distance between optical axes of the light emitting elements. The light emitting elements may be located at uniform intervals or at uneven intervals. The pitch of the light emitting elements may be the same or different in two different directions.

Figure 2:
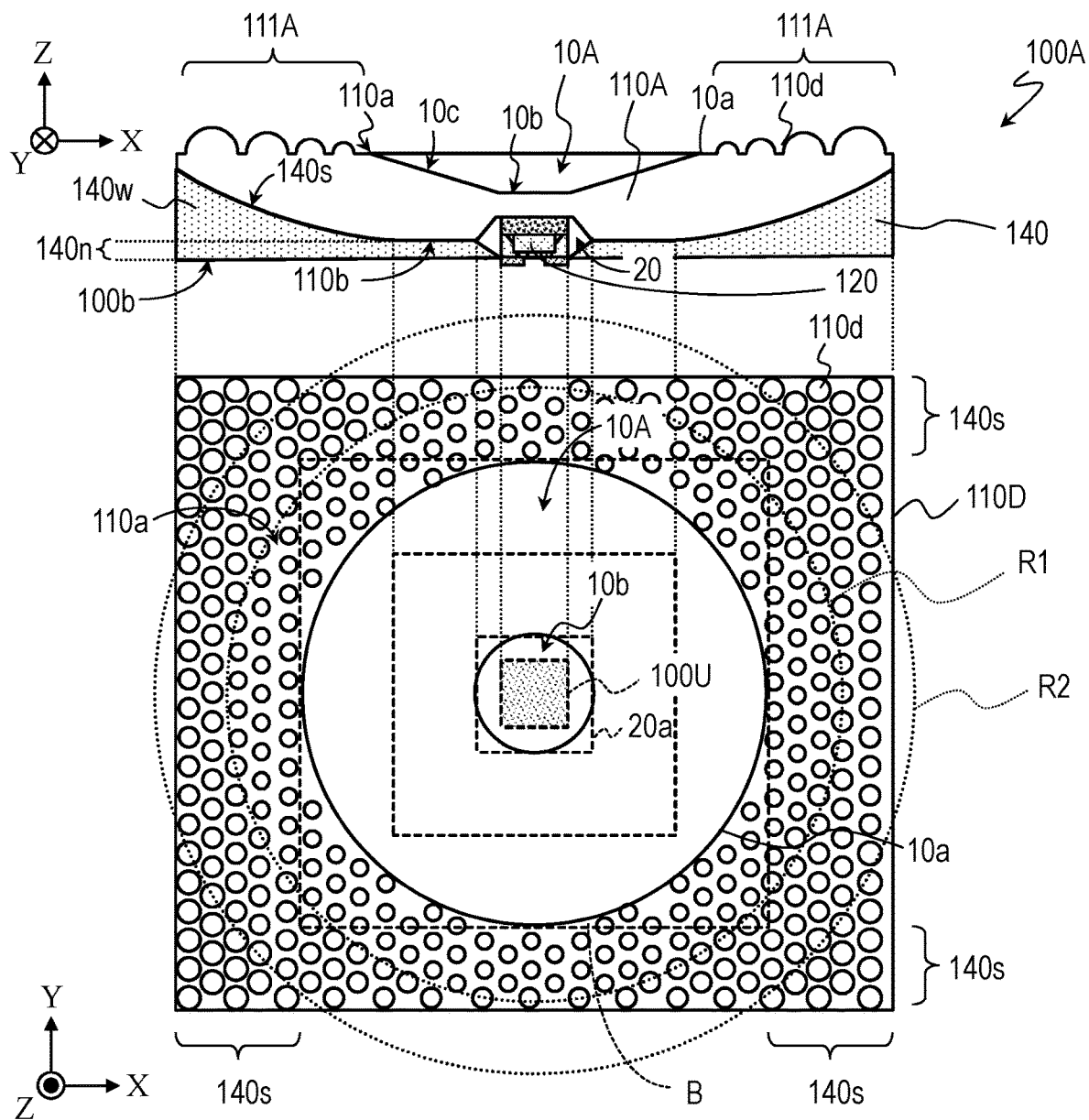
FIG. 2 schematically shows a cross-section of an example of the light emitting module shown in FIG. 1 and an example of external appearance of the light emitting module as seen from an upper surface side of a lightguide plate.

FIG. 2 shows a light emitting module 100A as an example of the light emitting modules 100. FIG. 2 schematically shows a cross-section of the light emitting module 100A taken along a line passing through the center or in the vicinity of the center of the light emitting module 100A and perpendicular to the upper surface 210a of the lightguide plate 210, and also shows an example of an external appearance of the light emitting module 100A as seen from the upper surface 210a side of the lightguide plate 210 in a direction perpendicular to the upper surface 210a.

The light emitting module 100A includes a lightguide plate 110A having an upper surface 110a defining a first hole 10A formed therein and a lower surface 110b opposite to the upper surface 110a, and also includes a light emitting element 120. The lightguide plate 110A is a portion of the lightguide plate 210 shown in FIG. 1, and the first hole 10A of the lightguide plate 110A is a corresponding one of the plurality of first holes 10 shown in FIG. 1. A single continuous lightguide plate 110A may be employed for two adjacent light emitting modules 100A in the surface-emitting light source 200. Alternatively, for example, each of the light emitting modules 100A may include an individual lightguide plate 110A, and in this case, a clear boundary may be recognized between the lightguide plates 110A of the two light emitting modules 100A in the surface-emitting light source 200.

In the configuration shown in FIG. 2, the light emitting module 100A further includes a first light-reflective member 140 located on the lower surface 110b side of the lightguide plate 110A. The first light-reflective member 140 is a portion of the light-reflective member 240 shown in FIG. 1. In this example, the first light-reflective member 140 includes a layer-shaped base portion 140n and a wall portion 140w extending upward toward the upper surface 110a from the lower surface 110b side of the lightguide plate 110A. The wall portion 140w has a slope 140s surrounding the light emitting element 120. Among the rectangles formed by dashed lines shown in a lower part of FIG. 2, the outermost rectangle B represents an inner periphery of the wall portion 140w. While the inner periphery of the wall portion 140w forms a rectangular shape in this example, the inner periphery of the wall portion 140w may form a circular shape, an elliptical shape or the like. As in the lightguide plates 110A, a single continuous first light-reflective member 140 may be employed for two adjacent light emitting modules 100A in the surface-emitting light source 200.

The first hole 10A of the lightguide plate 110A is defined at the center or in the vicinity of the center of the upper surface 110a. In this example, the first hole 10A has an inverted frustum cone shape. The first hole 10A having an inverted frustum cone shape includes an opening 10a located in the upper surface 110a of the lightguide plate 110A, an upward-facing surface 10b, and a lateral surface 10c located between the opening 10a and the upward-facing surface 10b.

In the light emitting module 100A, the light emitting element 120 is located on the lower surface 110b side of the lightguide plate 110A so as to face the first hole 10A defined in the upper surface 110a of the lightguide plate 110A. In the example shown in FIG. 2, a second hole is defined on the lower surface 110b side of the lightguide plate 110A, and the light emitting element 120 is located in the second hole 20 in a plan view. An optical axis of the light emitting element 120 substantially coincides with the center of the first hole 10A. In this example, the light emitting element 120 is included in a light emitting unit 100U, and the light emitting unit 100U is located on the lower surface 110b side of the lightguide plate 110A. As described below, the light emitting unit 100U may include a wavelength conversion member or the like in addition to the light emitting element 120.

The upper surface 110a of the lightguide plate 110A includes a first region 111A defining a plurality of protrusions and/or recesses. The first region 111A is located in a region of the upper surface 110a that does not overlap the first hole 10A. In the example shown in FIG. 2, a plurality of protrusions 110d are defined in the first region 111A.

For example, in the upper surface 110a of the lightguide plate 110A, the plurality of protrusions 110d may be defined in the region that does not overlap the first hole 10A, so that light that is emitted from the light emitting element 120 and introduced into the lightguide plate 110A from the lower surface 110b side of the lightguide plate 110A can be extracted from the first region 110A efficiently. That is, the luminance of the first region 110A as seen in a direction normal to the upper surface 110a of the lightguide plate 110A may be relatively improved.

In this example, as shown in the lower part of FIG. 2, in the upper surface 110a, the first region 111A occupies the entire region that does not overlap the first hole 10A, and the plurality of protrusions 110d have a shape of a plurality of dots in the first region 111A. FIG. 2 is a schematic view illustrating the structure of the upper surface 110a of the lightguide plate 110A, and that the number or the shape of the plurality of protrusions 110d and the like may not coincide between the cross-sectional view and the plan view. This is also applicable to the other figures of the present disclosure.

As schematically shown in FIG. 2, a ratio of the area occupied by the protrusions 110d per unit area in the first region 111A is increased concentrically in an outward direction from the light emitting element 120 at the center. In this example, in a plan view, each of the plurality of protrusions 110d has a circular outer shape in a plan view, and the plurality of protrusions 110d have a diameter increasing in an outward direction from the center of the lightguide plate 110A. This will be described more specifically using an imaginary circle R1 and an imaginary circle R2 represented by the dotted lines in FIG. 2 and centered around the light emitting element 120. The imaginary circle R2 has a diameter longer than that of the imaginary circle R1. The protrusions 110d located in a region between the imaginary circle R1 and the imaginary circle R2 have a diameter greater than that of the protrusions 110d located in a region between the imaginary circle R1 and the opening 10a of the first hole 10A. In addition, of the plurality of protrusions 110d, the protrusions 110d located outward of the imaginary circle R2 have a diameter greater than that of the protrusions 110d located in the region between imaginary circle R1 and imaginary circle R2. As can be understood from the configuration shown in FIG. 2, the diameter of the plurality of protrusions 110d do not need to increase uniformly in a direction outward from the light emitting element 120.

As shown in FIG. 2, with a structure in which the ratio of the area occupied by the plurality of protrusions 110 per unit area in the first region 111A increases concentrically in an outward direction from the light emitting element 120, the amount of light that is emitted from a position far from the light emitting element 120 can be relatively increased. With such a configuration, the amount of light that is output from a position far from the light emitting element 120 may be relatively increased. In this example, a plurality of protrusions 110d located in the vicinity of four corners of the upper surface 110a of the lightguide plate 110A have the maximum diameter among the plurality of protrusions 110d located in the first region 111A. Therefore, the luminance of the vicinity of the four corners of the upper surface 110a of the lightguide plate 110A can be increased as compared with the luminance of other regions of the first region 111A. Improvement in the luminance of the regions that are likely to be relatively dark allows further effective reduction in the unevenness in luminance while reducing an increase in thickness of the lightguide plate 110A.

Hereinafter, each of the components of the light emitting module 100A will be described in more detail.

Lightguide Plate 110A

The lightguide plate 110A has a function of diffusing the light from the light emitting element 120 and causing the light to be emitted from the upper surface 110a. In this embodiment, the upper surfaces 110a of the plurality of lightguide plates 110A forms a light emission surface of the surface-emitting light source 200.

The lightguide plate 110A is a substantially plate-shaped member that may be formed of at least one of a thermoplastic resin such as acrylic resin, polycarbonate, cyclic polyolefin, polyethylene terephthalate, polyester or the like; a thermosetting resin such as epoxy, silicone or the like; glass, and combinations thereof, and is light-transmissive. Among these materials, polycarbonate can realize a high transparency while being inexpensive. The terms "light-transmissive" and "light transmitting" in the present specification are construed as encompassing diffusiveness for incident light, and are not limited to referring to "transparent". The lightguide plate 110A may include, for example, a material dispersed therein that has a refractive index different from that of a base material, so as to be light-diffusive.

The first hole 10A defined in the upper surface 110a of the lightguide plate 110A serves to reflect light emitted from the light emitting element 120 and introduced into the first hole 10A from the lower surface 110b side of the lightguide plate 110A, and to diffuse the light in the plane of the lightguide plate 110A. In this example, the first hole 10A is not filled with a resin or the like. In other words, an air layer is present in the first hole 10A. The first hole 10A may be filled with a material having a refractive index lower than that of the lightguide plate 110A.

Such a light diffusion structure may be provided in the form of, for example, the first hole 10A in the lightguide plate 110A, which allows for improving the luminance of a region of the upper surface 110a other than the region directly above the light emitting element 120. That is, the unevenness in luminance of the upper surface 110a of the light emitting module 100A can be suppressed, and the first hole 10A serving as the light diffusion structure contributes to reduction in thickness of the lightguide plate 110A. The thickness of the lightguide plate 110A, that is, the distance between the lower surface 110b and the upper surface 110a, is typically in a range of about 0.1 to 5 mm. According to certain embodiments of the present disclosure, the thickness of the lightguide plate 110A may be about 750 μm.

In this example, the lateral surface 10c of the first hole 10A has substantially a straight line shape in a cross-sectional view. The lateral surface 10c may have any appropriate shape other than a straight line in a cross-sectional view, such as a shape including a bending portion and/or a stepped portion, a curved-line shape, or the like. In the case where the lateral surface 10c is shaped like a curved line, in particular, a curved line protruding toward the first hole 10A, it is easy to diffuse the light to a position far from the center of the lightguide plate 110A, which is advantageous in view of obtaining uniform light on the upper surface 110a side.

Any appropriate shape other than the shape shown in FIG. 2 may be employed for the specific shape of the first hole 10A. The specific configuration of the first hole 10A serving as the light diffusion structure may be appropriately determined in accordance with the shape, characteristics or the like of the light emitting element 120 located on the lower surface 110b side of the lightguide plate 110A. The first hole 10A may have, for example, a conical shape, a polygonal pyramid-shape such as a quadrangular pyramid shape or a hexagonal pyramid shape, a frustum polygonal pyramid shape, or the like.

Figure 3:
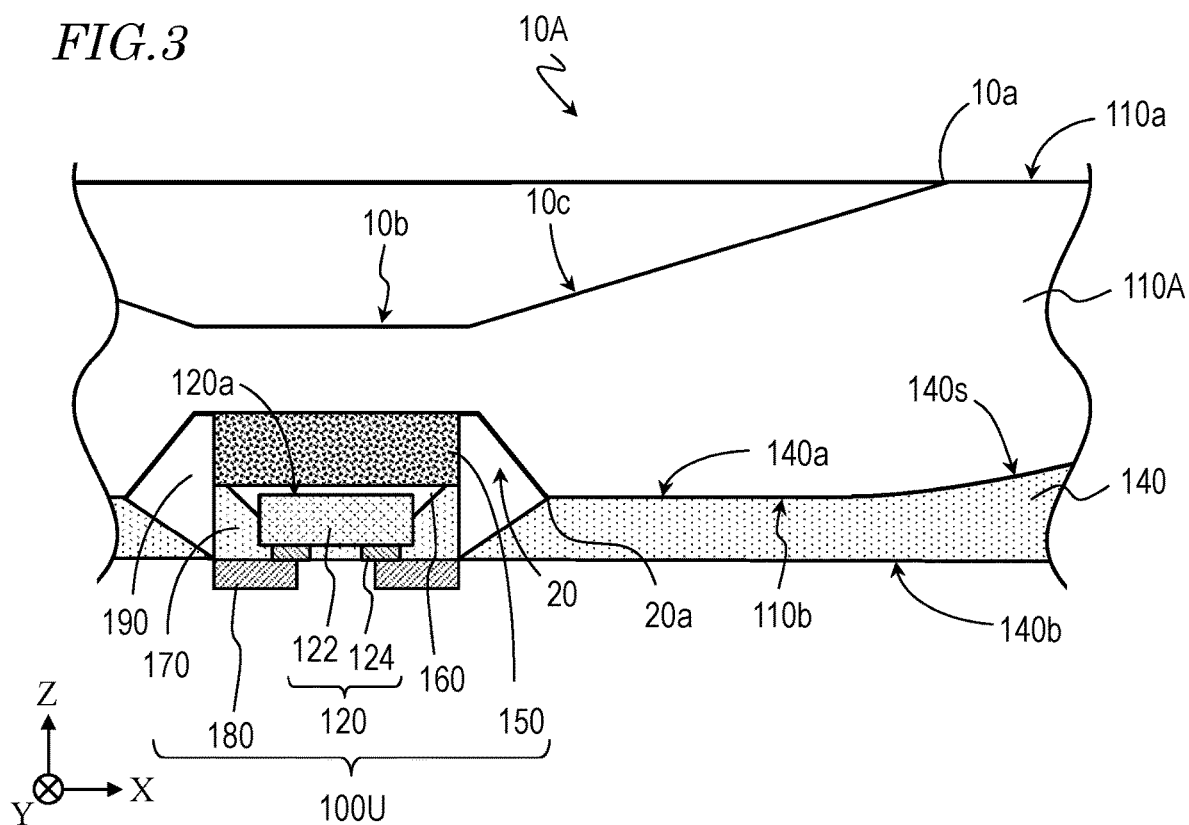
FIG. 3 is a schematic enlarged cross-sectional view of a light emitting element and the vicinity thereof shown in FIG. 2.

The first hole 10A has a depth in the range of, for example, 300 to 400 μm. In the case where the first hole 10A has an inverted frustum cone shape including the upward-facing 10b as shown in FIG. 2 and FIG. 3, the depth of the first hole 10A may be decreased while decrease in the capacity thereof is reduced, as compared with the case where the first hole 10A is inverted cone-shaped. That is, a thickness of the light emitting module 100A can be further reduced. The opening 10a of the first hole 10A has a diameter of, for example, about 3 mm.

The lightguide plate 110A may be of a single layer, or may have a layered structure including a plurality of light-transmissive layers. In the case where the plurality of light-transmissive layers are layered together, a layer having a refractive index different from that of other layers of the plurality of light-transmissive layers, for example, an air layer or the like, may be disposed between appropriate adjacent layers of the plurality of light-transmissive layers. With the presence of, for example, such an air layer between appropriate adjacent layers of the layered structure, light emitted from the light emitting element 120 can be easily diffused, which can further decrease the unevenness in luminance.

In the example shown in the figures, the lightguide plate 110A has the second hole 20 defined on the lower layer 110b side, at a position facing the first hole 10A. In the second hole 20, the light emitting unit 100U including the light emitting element 120 is located. FIG. 3 is an enlarged cross-sectional view showing the light emitting element 120 and the vicinity thereof shown in FIG. 2. As shown in FIG. 3, in this example, the light emitting unit 100U includes a plate-like wavelength conversion member 150, a first bonding member 160 and a second light-reflective member 170 in addition to the light emitting element 120. The light emitting unit 100U is bonded at the position of the second hole 20 of the lightguide plate 110A via a second bonding member 190.

As can be understood from FIG. 2, the second hole is, for example, frustum quadrilateral pyramid-shaped. Typically, the center of the second hole 20 located on the lower surface 110b side of the lightguide plate 110A substantially coincides with the center of the first hole 10A located on the upper surface 110a side. The second hole 20 has an opening 20a in the lower surface 110b of the lightguide plate 110A, and the opening 20a has a length along a diagonal line of the rectangular shape in a range of, for example, 0.05 to 10 mm, preferably 0.1 to 1 mm.

In the case where the second hole 20 has a rectangular shape in a plan view, the second hole 20 may be formed in the lower surface 110b of the lightguide plate 110A such that each side of the rectangular second hole 20 is parallel to a corresponding side of the rectangular lightguide plate 110A in a plan view as shown in FIG. 2. Alternatively, the second hole 20 may be formed in the lower surface 110b of the lightguide plate 110A such that each side of the rectangular second hole 20 is inclined with respect to a corresponding side of the rectangular lightguide plate 110A in a plan view.

Figure 4:
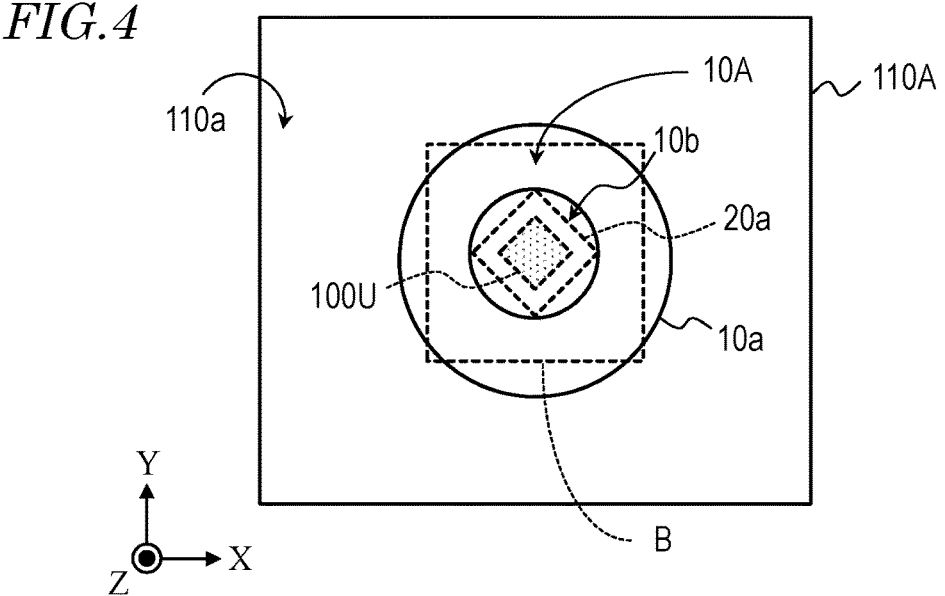
FIG. 4 is a schematic plan view showing another example of external appearance of the light emitting module as seen in a direction normal to the upper surface of the lightguide plate, and shows an example in which a rectangular opening of a second hole defined at a lower surface side of the lightguide plate is inclined at 45 degrees with respect to the lightguide plate with a rectangular shape in a plan view.

FIG. 4 shows an example in which the rectangular opening 20a of the second hole 20 is inclined by 45 degrees with respect to the rectangular lightguide plate 110A in a plan view. As shown in FIG. 4, in the case where the second hole 20 is formed such that each of the sides of the rectangular opening 20a is substantially parallel to the diagonal lines of the rectangular lightguide plate 110A, four side surfaces of the second hole 20 face respective corners of the rectangular lightguide plate 110A. That is, it is possible to increase the distance between each side surface of the second hole 20 and a corresponding corner of the lightguide plate 110A while decreasing the distance between each corner of the truncated rectangular pyramid-shaped second hole 20 and a corresponding side of the lightguide plate 110A. Such a configuration may further reduce the unevenness in luminance depending on optical characteristics of the light emitting unit 100U.

Example of a shape of the second hole 20 in a plan view include a rectangular shape as shown in FIG. 2 and FIG. 4 and a circular shape. In embodiments of the present disclosure, the second hole 20 does not need to have a shape similar to the external shape of the lightguide plate 110A. The shape and the size of the second hole 20 may be appropriately determined in accordance with the desired optical characteristics. For example, the second hole 20 may have a frustum cone shape or the like.

As described above, in the configuration shown in FIG. 2, each of the plurality of protrusions 110d is a circular dot. The circular protrusions 110d have a diameter in the range of, for example, 1 to 500 μm. The protrusions 110d may have shapes other than a true circle in a plan view. The plurality of protrusions 110d may have an elliptical shape, a distorted circular shape, a polygonal shape, an indeterminate shape or the like in a plan view. In this specification, the "shape" of a protrusion or a recess in a plan view refers to the shape of a periphery of the protrusion or the recess projected onto a plane parallel to an upper surface of a lightguide plate. In the case where the protrusion (or the recess) in a plan view has a shape other than a circle, the diameter of an imaginary circle surrounding the periphery of the protrusion (or the opening of the recess) is, for example, in the range described above.

The protrusions 110d protruding from the upper surface 110a of the lightguide plate 110A allows reduction in the total reflection in the lightguide plate 110A, which allows for obtaining an effect of increasing the amount of the light extracted from the upper surface 110a. Therefore, the protrusions 110d may have various shapes including a semispherical shape, a conical shape, a polygonal pyramid shape, a frustum polygonal pyramid shape, and the like.

In the example shown in FIG. 2, the plurality of protrusions 110d are arranged two-dimensionally in the first region 111A such that centers of the protrusions 110d are located on lattice points of a triangular lattice. Other appropriate arrangement of the plurality of protrusions 110d may be employed, and any appropriate arrangement of the plurality of protrusions 110d may be employed in accordance with desired optical characteristics. For example, the plurality of protrusions 110d may be arranged two-dimensionally in the first region 111A such that the centers thereof are on lattice points of a square lattice.

Figure 5:
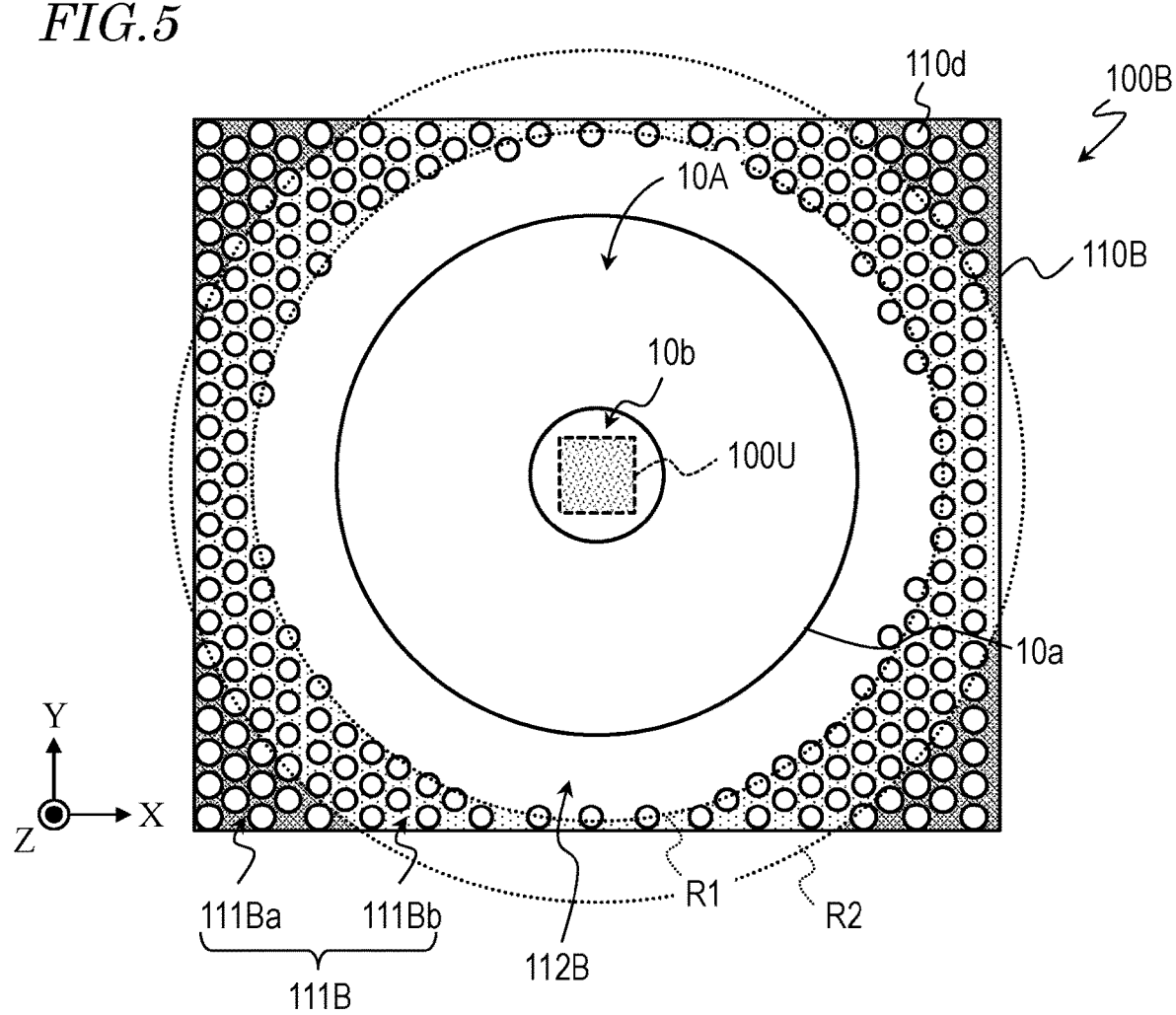
FIG. 5 is a schematic plan view showing another example of the lightguide plate including a plurality of protrusions at the upper surface of the lightguide plate.

FIG. 5 shows another example of the lightguide plate including a plurality of protrusions at an upper surface of the lightguide plate. A light emitting module 100B shown in FIG. 5 includes a lightguide plate 110B, and the lightguide plate 110B has an upper surface 110a including a first region 111B and a second region 112B located inward of the first region 111B. The second region 112B is an annular region, of the upper surface 110a of the lightguide plate 110B, that surrounds the first hole 10A.

The first region 111B is located outward of the second region 112B and surrounds the second region 112B.

In the example shown in FIG. 5, the first region 111B is a region of the upper surface 110a located outward of an imaginary circle R1, and the upper surface 110a has a plurality of protrusions 110d in the first region 111B. As in the example described above with reference to FIG. 2, among the circular protrusions 110d arranged in the first region 111B, protrusions 110d arranged outward of imaginary circle R2 have a diameter greater than that of the protrusions 110d arranged inward of the imaginary circle R2. Hereinafter, a region 111Ba of the first region 111B located outward of the imaginary circle R2 may be referred to as an "outer region". Also, a region 111Bb of the first region 111B located closer to the light emitting element 120 than the outer region, in other words, the region 111Bb located between imaginary circle R1 and imaginary circle R2, may be referred to as an "inner region". In FIG. 5, the inner region 111Bb is represented as the shaded area, and the outer region 111Ba is represented as the darker-shaded area, for ease of understanding.

The second region 112B is a region of the upper surface 110a located between imaginary circle R1 and the opening 10a of the first hole 10A. No protrusions 110d are formed at the upper surface 110a in the second region 112B. Therefore, in this example, the upper surface 110a in the second region 112B is a flat surface.

As shown in FIG. 5, the plurality of protrusions 110d do not need to be formed at the entire upper surface 110a, and may be formed in, for example, at least a portion of the first region 111B. When the lightguide plate 110B has the plurality of protrusions 110d or the like in a region relatively far from the light emitting element 120, the amount of light extracted from the region relatively far from the light emitting element 120, that is, the amount of light extracted from the first region 111B, can be larger than the amount of light extracted from the second region 112B. As a result, the luminance of the first region 111B farther from the light emitting element 120 may be increased, allowing for effectively reducing unevenness in luminance.

As described above, in the examples shown in FIG. 2 and FIG. 5, the ratio of an area occupied by the plurality of protrusions 110d per unit area of the upper surface 110a of the lightguide plate increases concentrically in an outward direction from the light emitting element 120. The term "concentric" or "concentrically" in the present specification indicates that a plurality of shapes have a common center, but are not intended to indicate that the plurality of shapes having such a common center are limited to being true circles. Imaginary circle R1 and/or imaginary circle R2 described above is not limited to being a true circle, and may be an ellipse or the like. In the case where, for example, the upper surface 110a of the lightguide plate 110B has a rectangular shape, imaginary circle R1 and imaginary circle R2 may have an elliptical shape. In this case, the "center" of these ellipses refers to the position at which the major axis and the minor axis of the ellipses intersect each other.

Figure 6:
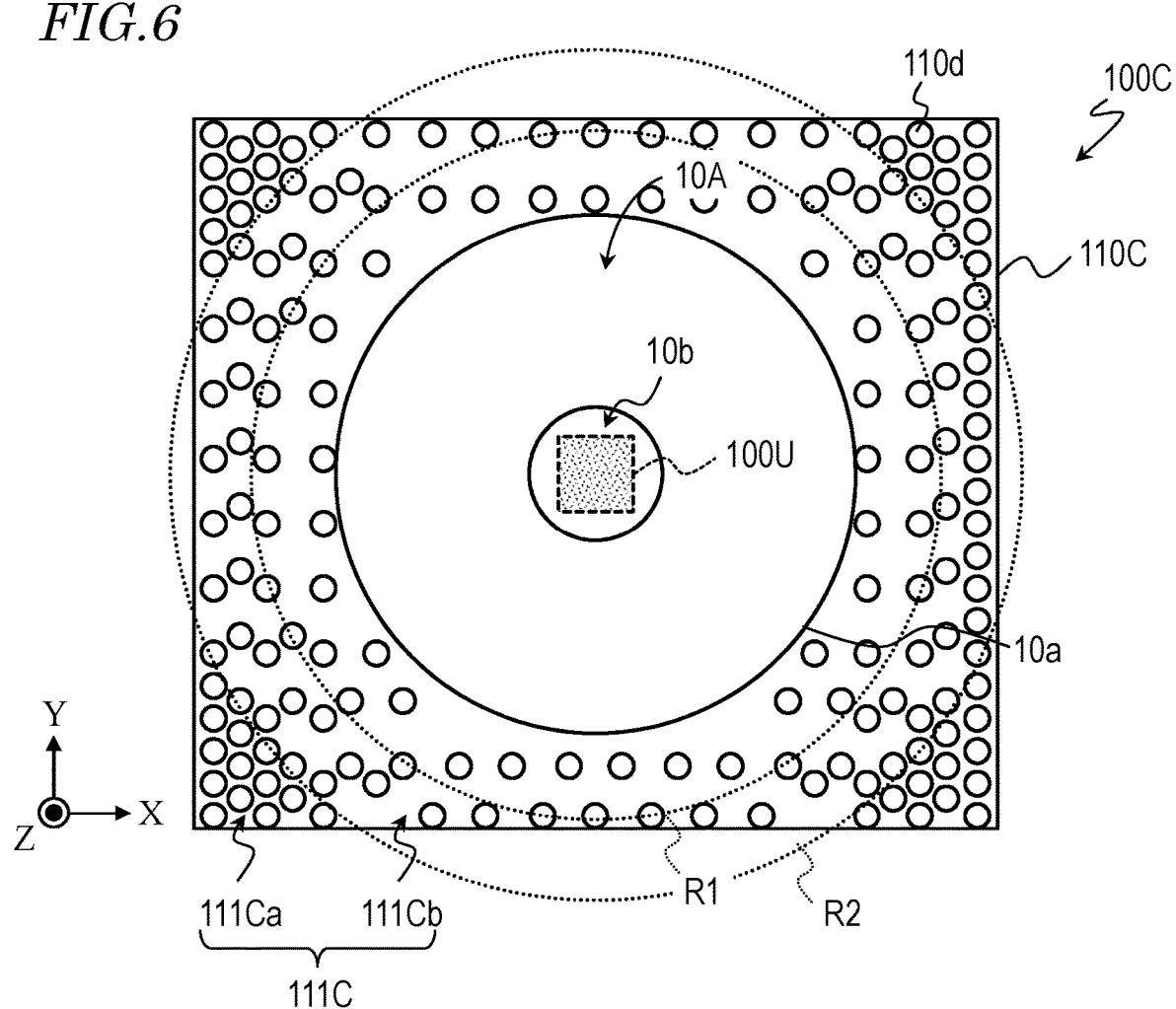
FIG. 6 is a schematic plan view showing still another example of the lightguide plate including a plurality of protrusions at the upper surface of the lightguide plate.

FIG. 6 shows still another example of lightguide plate including a plurality of protrusions at an upper surface thereof. A light emitting module 100C shown in FIG. 6 includes a lightguide plate 100C including a first region 111C at the upper surface 110a of the lightguide plate 100C. The first region 111C includes an outer region 111Ca outer to imaginary circle R2 and an inner region 100Cb between imaginary circle R1 and imaginary circle R2.

In the configuration shown in FIG. 6, the plurality of protrusions 111d are formed in the first region 111C of the upper surface 110a. In this example, among the plurality of protrusions 110d arranged in the first region 111C, a plurality of protrusions 110d arranged in the inner region 111Cb have a number density higher than that of a plurality of protrusions 110d arranged inward of the imaginary circle R1. A plurality of protrusions 110d arranged in the outer region 111Ca have a number density higher than that of the plurality of protrusions 110d arranged in the inner region 111Cb. In other words, the number density of the plurality of protrusions 111d arranged in the first region 111C is increased in an outward direction from the light emitting element 120.

The "number density of a plurality of protrusions (or recesses)" as used herein refers to the number of protrusions (or recesses) per unit area on the upper surface of the lightguide plate. As shown in FIG. 6, increase in the number density of the plurality of protrusions 110d in an outward direction from the light emitting element 120 allows the ratio of the area occupied by the protrusions 110d per unit area to be increased concentrically in an outward direction from the light emitting element 120. Thus, also with the configuration shown in FIG. 6, the luminance of a region located far from the light emitting element 120 can be increased, so that an effect of reducing the unevenness in luminance can be obtained.

In the example shown in FIG. 6, the density of the plurality of protrusions 110d increases in an outward direction from the light emitting element 120. That is, the plurality of protrusions 110d may be arranged such that the pitch of the plurality of protrusions 110d decreases in an outward direction from the light emitting element 120. The "pitch of the plurality of protrusions (or recesses)" refers to the minimum distance between the centers of two adjacent protrusions (or recesses), and may be defined for each of regions of the upper surface 110a (e.g., for each of the outer region 111Ca and the inner region 111Cb). The pitch of the plurality of protrusions 110d may be appropriately selected in accordance with the sizes and the shapes of the protrusions 110d, the optical characteristics to be provided, or the like. The pitch of the plurality of protrusions 110d may be in the range of, for example, 10 to 200 μm.

In this example, a plurality of protrusions 110d are arranged also in a region between imaginary circle R1 and the opening 10a of the first hole 10A. Alternatively, the region between imaginary circle R1 and the opening 10a of the first hole 10A may be a second region with no protrusions 110d.

Light Emitting Element 120

FIG. 3 will be referred to again. Typical examples of the light emitting element 120 include an LED. In the configuration shown in FIG. 3, the light emitting element 120 includes a main body 122 and electrodes 124 arranged on the side opposite to an upper surface 120a of the light emitting element 120. The main body 122 includes, for example, a support substrate of sapphire, gallium nitride or the like, and a semiconductor layered structure on the support substrate. The semiconductor layered structure includes an n-type semiconductor layer, a p-type semiconductor layer and an active layer located between the n-type semiconductor layer and the p-type semiconductor layer. The semiconductor layered structure may contain a nitride semiconductor ($In_xAl_yGa_{1-x-y}N$, $0 \leq x$, $0 \leq y$, $x+y \leq 1$) configured to emit light in an ultraviolet to visible range. In this example, the upper surface 120a of the light emitting element 120 coincides an upper surface of the main body 122. The electrodes 124 include positive and negative electrodes, and serve to supply a predetermined current to the semiconductor layered structure.

When a plurality of light emitting elements 120 are disposed in the surface-emitting light source 200, light emitting elements configured to emit blue light or light emitting elements configured to emit white light may be employed for the plurality of light emitting elements 120. The plurality of light emitting elements 120 may include light emitting elements configured to emit light with different colors. For example, the plurality of light emitting elements 120 may include a light emitting element configured to emit red light, a light emitting element configured to emit blue light and a light emitting element configured to emit green light. In the description below, an example in which an LED configured to emit blue light is used for the light emitting element 120 will be described.

In this example, the light emitting element 120 in each of the light emitting modules 100A is secured to the side of a lower surface of the wavelength conversion member 150 with the first bonding member 160. The light emitting element 120 typically has a rectangular shape in a plan view. One side of the rectangular light emitting element 120 has a length of, for example, 1000 μm or shorter. The light emitting element 120 may have a length of 500 μm or shorter in each of the longitudinal direction and the transverse direction. A light emitting element having a length of 500 μm or shorter in each of the longitudinal direction and the transverse direction is easily available at low cost. Alternatively, the light emitting element 120 may have a length of 200 μm or shorter in each of the longitudinal direction and the transverse direction. A light emitting element having such short sides is advantageous for representing a high definition image, performing a local dimming operation or the like when being employed for a backlight unit of a liquid crystal display device. In particular, in a light emitting element having a length of 250 μm or shorter both in the longitudinal direction and the transverse direction, an area of the upper surface of the light emitting element is reduced, which allows for relatively increasing an amount of light from a side surface of the light emitting element. For this reason, such a light emitting element allows for easily obtaining a batwing light distribution characteristic. The "batwing light distribution characteristic" refers to, in a broad sense, a light distribution characteristic defined by an emission intensity distribution in which the emission intensity is higher at light distribution angles having an absolute value greater than 0 degrees, where the optical axis perpendicular to the upper surface of the light emitting element has an angle of 0 degrees.

Wavelength Conversion Member 150

In the configuration shown in FIG. 3, the wavelength conversion member 150 is disposed in the second hole 20 so as to be located between the lightguide plate 110A and the light emitting element 120. In other words, the wavelength conversion member 150 is located at a downward-facing surface defining the second hole 20 above the light emitting element 120. The term "downward-facing surface defining the second hole 20" refers to a portion that corresponds to the bottom of the second hole 20 in the state where the lower surface 110b of the lightguide plate is directed upward. In this manner, in this specification, the terms "downward-facing surface" and "upward-facing surface" may be used regardless of the orientation in which the light emitting module is shown in the figures. In the example shown in FIG. 3, the downward-facing surface of the second hole 20 may be considered as a ceiling of a dome-like structure on the lower surface 110b side of the lightguide plate 110A in the state where the light emitting module 100A is in the orientation shown in FIG. 3.

The wavelength conversion member 150 absorbs at least a portion of the light that is emitted from the light emitting element 120 and emits light having a wavelength different from that of the light from the light emitting element 120. For example, the wavelength conversion member 150 converts the wavelength of a portion of the blue light that is emitted from the light emitting element 120 and emits yellow light. With such a configuration, the blue light that has passed the wavelength conversion member 150 and the yellow light emitted from the wavelength conversion member 150 are mixed together to emit white light. In the configuration shown in FIG. 3, the light that is emitted from the light emitting element 120 is basically introduced into the lightguide plate 110A via the wavelength conversion member 150. Therefore, the mixed light is diffused in the lightguide plate 110A, and, for example, the white light having reduced unevenness in luminance may be extracted from the upper surface 110a of the lightguide plate 110A. Such an embodiment of the present disclosure is advantageous to uniformize luminance of light as compared with the case where the light is diffused in the lightguide plate and then the wavelength is converted.

For the wavelength conversion member 150, a resin containing dispersed particles of a phosphor is typically employed. Examples of the resin containing dispersed particles of the phosphor include a silicone resin, a modified silicone resin, an epoxy resin, a modified epoxy resin, a urea resin, a phenolic resin, an acrylic resin, a urethane resin, a fluorine resin, or a resin containing two or more of these resins. In view of efficiently introducing light into the lightguide plate 110A, it is advantageous that a base material of the wavelength conversion member 150 has a refractive index lower than that of a material of the lightguide plate 110A. A material having a refractive index different from that of the base material may be dispersed in a material of the wavelength conversion member 150 to provide the wavelength conversion member 150 with a light diffusion function. For example, particles of titanium dioxide, silicon oxide or the like may be dispersed in the base material of the wavelength conversion member 150.

As the phosphor, a known material may be used. Examples of the phosphor include a YAG-based phosphor, a fluoride-based phosphor such as a KSF-base phosphor or the like, a nitride-based phosphor such as CASN or the like, a β-SiAlON phosphor, and the like. The YAG-based phosphor is an example of wavelength conversion substance that converts blue light into yellow light.

The KSF-based phosphor and CASN are examples of wavelength conversion substance that converts blue light into red light. The β-SiAlON phosphor is an example of wavelength conversion substance that converts blue light into green light. A quantum dot phosphor may be used for the phosphor.

The phosphor contained in the wavelength conversion member 150 is not necessarily the same among the plurality of light emitting modules 100 included in one surface-emitting light source 200. Phosphors dispersed in the base material of the wavelength conversion members 150 may be different among the plurality of light emitting modules 100. Of a plurality of the second holes 20 provided in the lightguide plate 210 of the surface-emitting light source 200, a wavelength conversion member adapted to convert blue incident light into yellow light may be arranged in some of the second holes 20, whereas a wavelength conversion member adapted to convert blue incident light into green light may be arranged in another of the second holes 20. Further, a wavelength conversion member adapted to convert blue incident light into red light may be arranged in the remaining ones of the second holes 20.

First Bonding Member 160

The first bonding member 160 is a light-transmissive member that covers at least a portion of a side surface of the light emitting element 120. As schematically shown in FIG. 3, the first bonding member 160 typically includes a layer-shaped portion located between the upper surface 120a of the light emitting element 120 and the wavelength conversion member 150.

Examples of a material of the first bonding member 160 include a resin composition containing a transparent resin material as a base material. The first bonding member 160 has a transmittance that is, for example, 60% or higher for light having an emission peak wavelength of the light emitting element 120. In view of utilizing the light effectively, it is advantageous that the transmittance of the first bonding member 160 for the light having the emission peak wavelength of the light emitting element 120 is 70% or higher, and it is more advantageous that the transmittance of the first bonding member 160 for the light having the emission peak wavelength of the light emitting element 120 is 80% or higher.

Typical examples of the base material of the first bonding member 160 include a thermosetting resin such as an epoxy resin, a silicone resin or the like. Examples of the base material of the first bonding member 160 include a silicone resin, a modified silicone resin, an epoxy resin, a phenolic resin, a polycarbonate resin, an acrylic resin, a polymethylpentene resin, a polynorbornene resin, or a material containing two or more of these materials. The first bonding member 160 typically has a refractive index lower than that of the lightguide plate 110A. For example, a material having a refractive index different from that of the base material may be dispersed in the first bonding member 160, so that the first bonding member 160 may have a light diffusion function.

As described above, the first bonding member 160 covers at least a portion of the side surface of the light emitting element 120. In this example, the first bonding member 160 has an outer surface that is an interface with a second light-reflective member 170 described below. Light that is emitted from the side surface of the light emitting element 120 and is incident on the first bonding member 160 is reflected by the outer surface of the first bonding member 160 toward above the light emitting element 120. The outer surface of the first bonding member 160 in a cross-sectional view is not limited to being shaped like a straight line as shown in FIG. 3. The outer surface of the first bonding member 160 in a cross-sectional view may have a bent-line shape, a curved-line shape protruding toward the light emitting element 120, a curved-line shape protruding in a direction outward from the light emitting element 120, or the like.

Second Light-Reflective Member 170

The second light-reflective member 170 is a light-reflective member located on a lower surface side of the wavelength conversion member 150 (on a side opposite to the lightguide plate 110A). As shown in FIG. 3, the second light-reflective member 170 covers the outer surfaces of the first bonding member 160. The second light-reflective member 170 also covers portions of the lateral surfaces of the light emitting element 120 that are not covered with the first bonding member 160, and a region of a lower surface of the light emitting element 120 other than the electrodes 124. The lower surface of the light emitting element 120 is opposite to the upper surface 120a of the light emitting element 120. The second light-reflective member 170 covers a lateral surface of the electrode 124, whereas a lower surface of the electrode 124 is exposed from a lower surface of the second light-reflective member 170.

The second light-reflective member 170 is formed of, for example, a light-reflective material such as a resin material or the like in which a light-reflective filler is dispersed. The terms "reflective" and "light-reflective" as used herein indicate that the reflectance for light having the emission peak wavelength of the light emitting element 120 is 60% or higher. It is advantageous that the second bonding member 170 has a reflectance of 70% or higher for light having the emission peak wavelength of the light emitting element 120, and it is more advantageous that the reflectivity of the second bonding member 170 has a reflectance of 80% or higher for light having the emission peak wavelength of the light emitting element 120.

Examples of a base material of the resin material used to form the second bonding member 170 include a silicone resin, a phenolic resin, an epoxy resin, a BT resin, a polyphthalamide (PPA), and the like. For the light-reflective filler, metal particles, or particles of an inorganic material or an organic material having a refractive index higher than that of the base material may be used. Examples of the light-reflective filler include particles of titanium dioxide, silicon oxide, zirconium dioxide, potassium titanate, aluminum oxide, aluminum nitride, boron nitride, mullite, niobium oxide, and barium sulfate; and particles of various rare earth oxides such as yttrium oxide, gadolinium oxide and the like. It is advantageous that the second light-reflective member 170 has white color.

With the second light-reflective member 170 covering the region of the lower surface of the light emitting element 120 other than the electrodes 124, leakage of light to the side opposite to the upper surface 110a of the lightguide plate 110A may be reduced. The lateral surfaces of the light emitting element 120 may also be covered with the second light-reflective member 170, so that light may be emitted from the light emitting element 120 concentratedly toward a region above the light emitting element 120, and thus light may be efficiently introduced into the wavelength conversion member 150.

Second Bonding Member 190

As described above, the light emitting unit 100U is disposed on the downward-facing surface defining the second hole 20 with the second bonding member 190. As shown in FIG. 3, at least a portion of the second bonding member 190 is located in the second hole 20. The second bonding member 190 may include a portion located between the downward-facing surface of the second hole 20 and the wavelength conversion member 150. As shown in FIG. 3, the second bonding member 190 may include a portion protruding toward the side opposite to the upper surface 110a of the lightguide plate 110A, beyond the lower surface 110b of the lightguide plate 110A.

As in the first bonding member 160, the second bonding member 190 may be formed of a resin composition containing a transparent resin material serving as a base material. For the second bonding member 190, a material different from or the same as a material of the first bonding member 160 may be used. The second bonding member 190 typically has a refractive index lower than that of the lightguide plate 110A.

First Light-Reflective Member 140

The first light-reflective member 140 is light-reflective and covers at least a part of the lower surface 110b of the lightguide plate 110A. In this example, the first light-reflective member 140 covers the second bonding member 190 in addition to the lower surface 110b of the lightguide plate 110A. With the second bonding member 190 covered with the first light-reflective member 140 as in this example, leakage of light from the second bonding member 190 toward the lower surface 110b side of the lightguide plate 110A may be reduced and the light extraction efficiency may be improved.

As described above with reference to FIG. 2, in this example, the first light-reflective member 140 partially includes the wall 140w. Accordingly, the slope 140s is formed at a portion of an upper surface 140a of the first light-reflective member 140, which faces the lower surface 110b of the lightguide plate 110A. As can be understood from FIG. 2, the slope 140s typically surrounds the light emitting element 120 along four sides of the rectangular upper surface 110a of the lightguide plate 110A. The slope 140s can serve as a reflective surface that reflects incident light toward the upper surface 110a of the lightguide plate 110A. Therefore, when the first light-reflective member 140 having the slope 140s is disposed on the lower surface 110b side of the lightguide plate 110A, light advancing toward the lower surface 110b side of the lightguide plate 110A may be reflected toward the upper surface 110a by the slope 140s. Thus, the light may be extracted more efficiently from the upper surface 110a. Further, with the slope 140s located on a peripheral region of the lightguide plate 110A, luminance of the peripheral region of the lightguide plate 110A is prevented from being excessively lower than that of a central region of the lightguide plate 110A.

In a cross-sectional view, the slope 140s may have a curved-line shape as shown in FIG. 2, or may have a straight-line shape. In a cross-sectional view, the slope 140s may have other appropriate shape, and may include a stepped portion, a bent portion or the like.

The wall 140w surrounding the light emitting element 120 may have heights different among the plurality of light emitting modules 100 included in one surface emission sight source 200, or different in a single light emitting module 100. For example, among a plurality of the slopes 140s included in one surface-emitting light source 200, the slopes 140s located at an outermost periphery of the lightguide plate 210 of the surface-emitting light source 200 may be higher than the slopes 140s located at different positions of the lightguide plate 210.

The first light-reflective member 140 may be formed of substantially the same material as that of the second light-reflective member 170. Using the same material for the first light-reflective member 140 and the second light-reflective member 170 allows for integrally forming a light-reflective member using a light-reflective material to cover substantially the entire lower surface 110b of the lightguide plate 110A. Forming the first light-reflective member 140 on the lower surface 110b side of the lightguide plate 110A allows for obtaining an effect of, for example, reinforcing the lightguide plate 110A. The same material may be used for the second light-reflective member 170 and a reflective resin layer 130.

Interconnect Layer 180

The light emitting module 100A may further include an interconnect layer 180 located on a lower surface 140b of the first light-reflective member 140. As shown in FIG. 3, the interconnect layer 180 includes wirings electrically connected with the electrodes 124 of the light emitting element 120. While the interconnect layer 180 in FIG. 3 is shown as being located on the second light-reflective member 170, the interconnect layer 180 may include a portion located on the lower surface 140b of the first light-reflective member 140.

The interconnect layer 180 is typically a single-layer film or a layered film, formed of a metal material such as Cu or the like. The interconnect layer 180 is connected with a power source or the like (not shown) to serve as a terminal that supplies a predetermined current to the plurality of light emitting elements 120.

With the interconnect layer 180 disposed at a lower surface 100b side of the light emitting module 100A, for example, the plurality of light emitting elements 120 in the surface-emitting light source 200 can be electrically connected with each other via the interconnect layer 180. That is, the light emitting elements 120 can be driven for the surface-emitting light source 200. As described below, a plurality of the surface-emitting light sources 200 may be combined to construct a larger surface-emitting light source. With such a configuration, the larger surface-emitting light source can perform a local dimming. With the interconnect layer 180 located on the lower surface 100b side of the light emitting module 100A, the wirings are disposed on the side of the surface-emitting light source 200 including the plurality of light emitting elements 120. This allows for facilitating connecting of the surface-emitting light source 200 with the power source or the like. That is, the connection of the surface-emitting light source 200 with the power source or the like allows for easily performing surface emission. The light emitting elements 120 may be driven for one or more light emitting modules 100A.

As described above, according to certain embodiments of the present disclosure, the lightguide plate defines the first hole 10 serving as a light diffusion structure, which allows light from the light emitting element 120 to be diffused in a plane of the lightguide plate while reducing an excessive increase in luminance right above the light emitting element 120. Accordingly, the surface-emitting light source 200 can emit uniform light while having a reduced thickness. In addition, as in the example described above with reference to FIG. 3, the wavelength conversion member 150 is disposed between the light emitting element 120 and the lightguide plate 110A, so that the light of mixed colors may be emitted from the upper surface 110a of the lightguide plate 110A after being diffused in a plane of the lightguide plate 110A.

According to certain embodiments of the present disclosure, for example, the structure including the first light-reflective member 140 can have a thickness reduced to, in other words, the distance between the lower surface of the electrode 124 of the light emitting element 120 and the upper surface 110a of the lightguide plate 110A can be reduced to, for example, 5 mm or shorter, 3 mm or shorter, or 1 mm or shorter. The distance between the lower surface of the electrode 124 of the light emitting element 120 and the upper surface 110a of the lightguide plate 110A may be in a range of about 0.7 mm to 1.1 mm.

Figure 7:
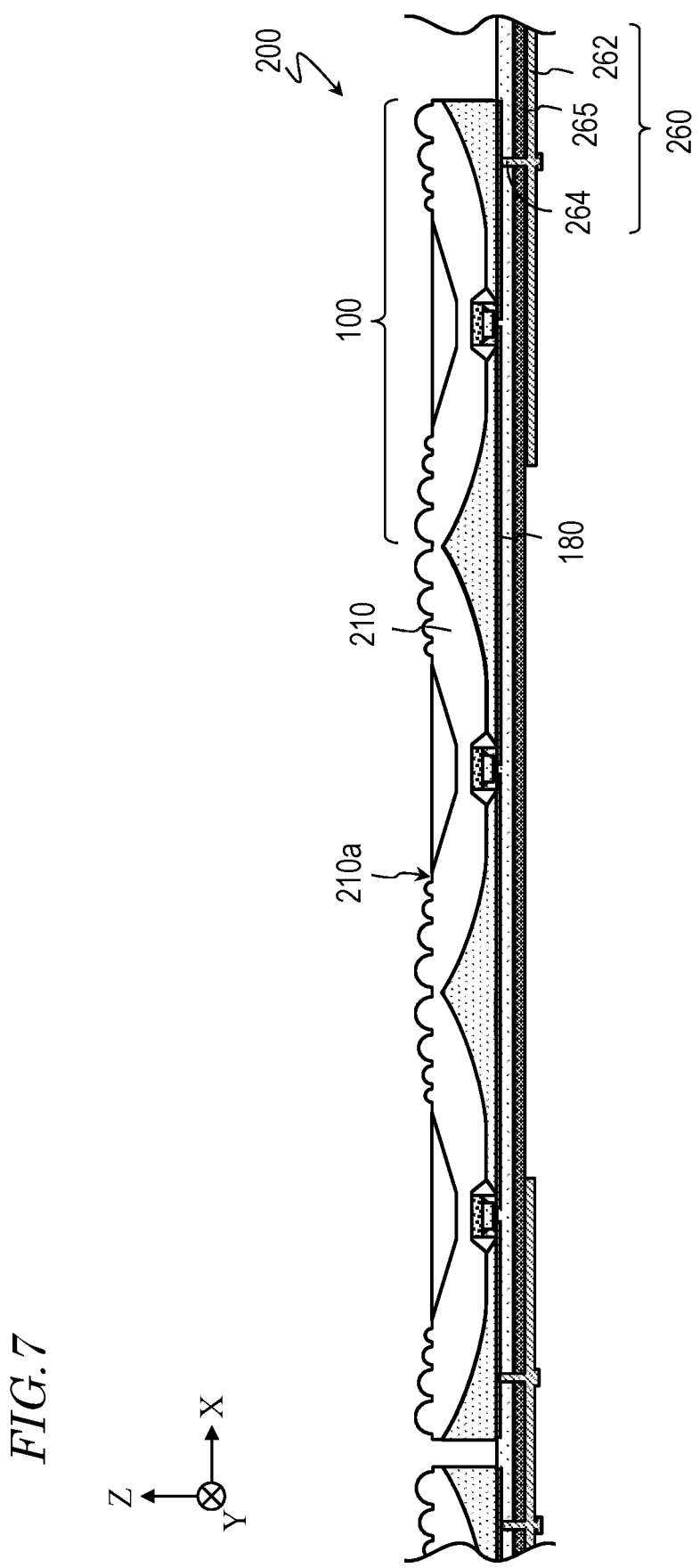
FIG. 7 is a schematic cross-sectional view showing an example in which the surface-emitting light source shown in FIG. 1 is connected with a wiring board.

FIG. 7 shows an example in which the surface-emitting light source 200 is connected with a wiring board. In one embodiment, as shown in FIG. 7, a light emitting device according to the present disclosure may include a wiring board 260. The wiring board 260 is disposed on a lower surface side of the surface-emitting light source 200, that is, on a side opposite to the upper surface 210a of the lightguide plate 210, and is connected with the interconnect layer 180 of the light emitting module 100.

In the configuration shown in FIG. 7, the wiring board 260 includes an insulative base 265, an interconnect layer 262 on the insulative base 265, and a plurality of vias 264 in the insulative base 265. The interconnect layer 262 is disposed on one of principal surfaces of the insulative base 265 that is opposite to the light emitting module 100. The interconnect layer 180 of the light emitting module 100 is connected to the vias 264 of the wiring board 260 via a third bonding member, such as solder or the like, that is disposed on the other principal surface (principal surface on the light emitting module 100 side) of the insulative base 265. The interconnect layer 262 is electrically connected with the interconnect layer 180 of the light emitting module 100 via the vias 264.

According to this embodiment, the interconnect layer 180 connected with the light emitting elements 120 may be located on the surface-emitting light source 200 side. Therefore, connection required for local dimming or the like may be easily formed without formation a complicated wiring pattern on the wiring board 260 side. The interconnect layer 180 may have an area larger than that of the lower surface of the electrode 124 of each of the light emitting elements 120, which allows for relatively easily establishing electrical connection between the interconnect layer 180 and the wiring board 260. In the case where, for example, the light emitting module 100 does not include the interconnect layer 180, the electrodes 124 of the light emitting element 120 may be connected with the corresponding vias 264 of the wiring board 260.

Figure 8:
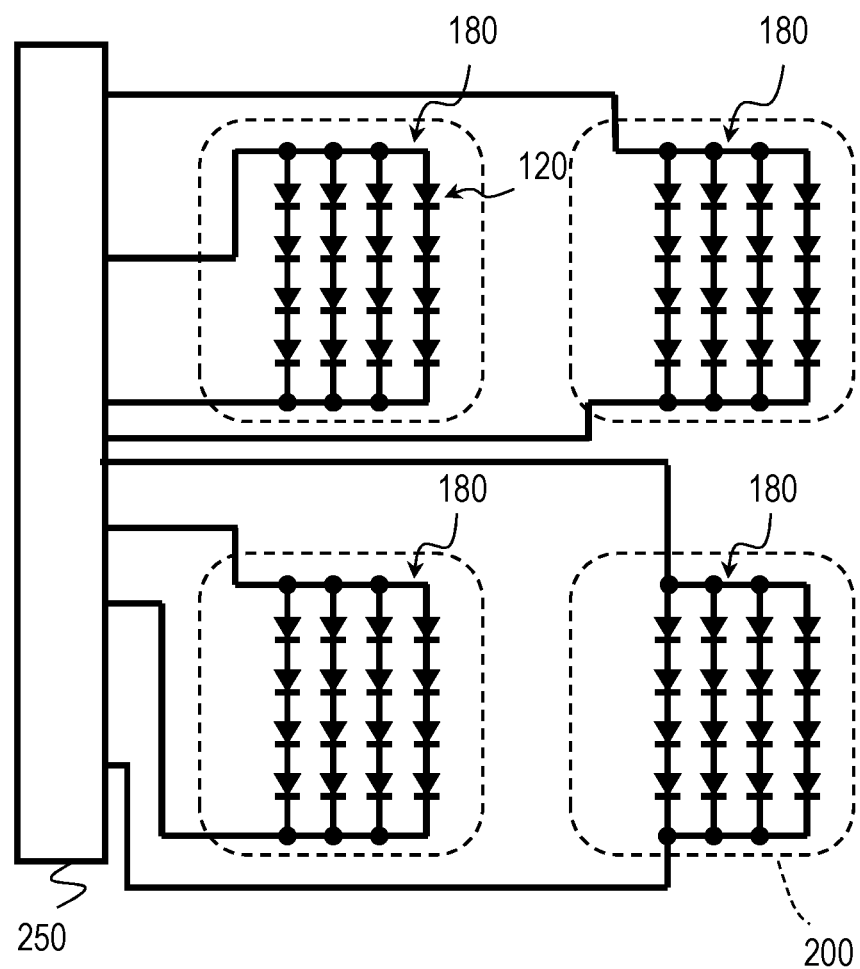
FIG. 8 shows an example of wiring pattern of an interconnect layer disposed on the surface-emitting light source side.

FIG. 8 shows an example of wiring pattern of the interconnect layer 180. For the sake of simplicity, FIG. 8 shows an example in which four surface-emitting light sources 200 each shown in FIG. 1 are connected with a single driver 250.

As described above, each of the surface-emitting light sources 200 may include the interconnect layer 180. The interconnect layer 180 in each surface-emitting light source 200 electrically connects the plurality of light emitting modules 100 included in the surface-emitting light source 200 to each other. In the example shown in FIG. 8, the interconnect layer 180 in each surface-emitting light source 200 connects four light emitting elements 120 in series, and connects, in parallel, groups each including the four light emitting elements 120 connected in series.

As shown in FIG. 8, these interconnect layers 180 can be connected with the driver 250 driving the light emitting elements 120. The driver 250 may be located on a board or the like (e.g., wiring board 260) supporting the plurality of the surface-emitting light sources 200 to be electrically connected with the interconnect layers 180, or may be located on a board different from the board or the like supporting the plurality of the surface-emitting light sources 200 to be electrically connected with the interconnect layers 180. With such a circuit configuration, a local dimming operation may be performed in groups of the surface-emitting light sources 200 each including 16 light emitting elements 120. The connection between the plurality of light emitting elements 120 by corresponding ones of the interconnect layers 180 is not limited to the example shown in FIG. 8, and the plurality of light emitting elements 120 may be connected such that the light emitting modules 100 in a single surface-emitting light source 200 are separately driven. Alternatively, the light emitting modules 100 included in a single surface-emitting light source 200 may be divided into a plurality of groups, and a plurality of light emitting elements 120 may be electrically connected with each other such that the light emitting elements 120 may be driven in the groups each including corresponding ones of the plurality of light emitting modules 100.

Figure 9:
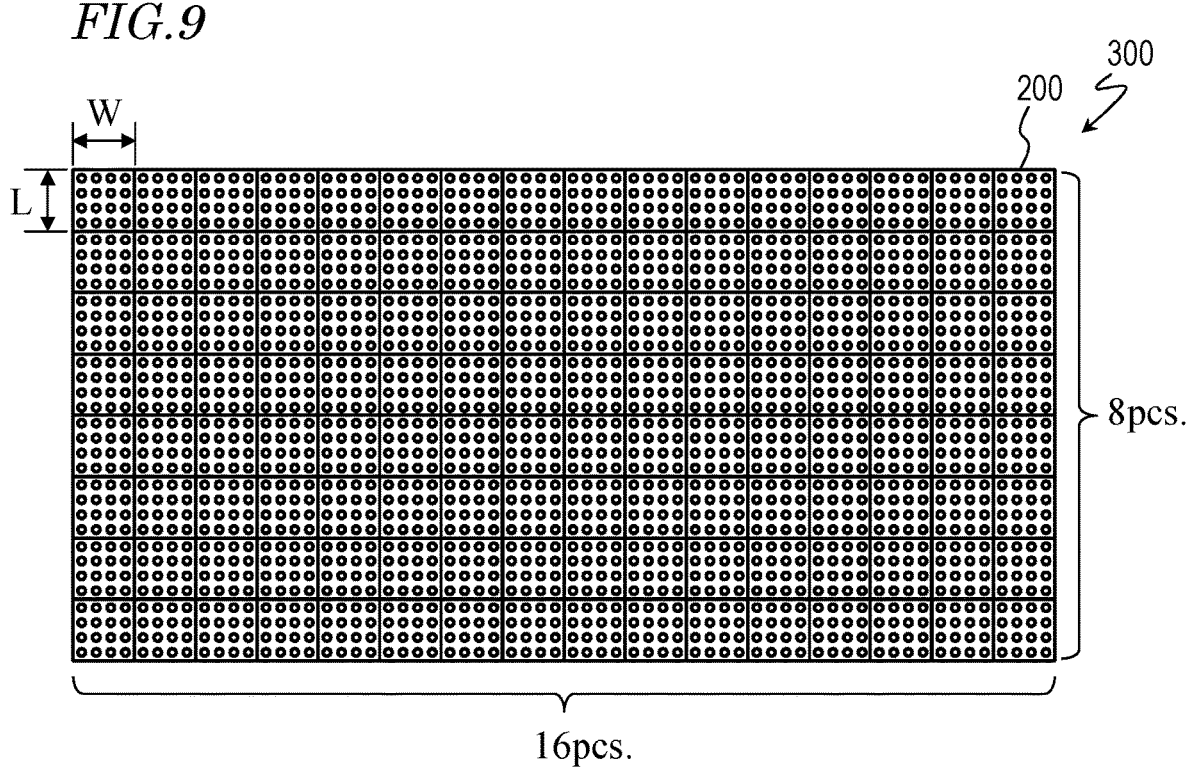
FIG. 9 is a schematic plan view showing an example in which a plurality of the surface-emitting light sources shown in FIG. 1 are arranged in two-dimensional array.

FIG. 9 shows an example in which a plurality of the surface-emitting light sources 200 are arranged two-dimensionally. The plurality of surface-emitting light sources 200 may be arranged two-dimensionally to obtain a light emitting surface having a large area.

A surface-emitting light source 300 shown in FIG. 9 includes a plurality of the surface-emitting light sources 200 each shown in FIG. 1. FIG. 9 shows an example in which the surface-emitting light sources 200 are arranged in eight rows by 16 columns, and schematically shows an external appearance of the surface-emitting light sources 200 arranged two-dimensionally as seen from the upper surface 210a side of the lightguide plate 210.

The lightguide plates 210 in two surface-emitting light sources 200 adjacent to each other in a row direction or a column direction are typically in contact with each other. However, the surface-emitting light sources 200 are not necessarily arranged two-dimensionally such that the lightguide plates 210 of such two adjacent surface-emitting light sources 200 are in contact with each other. A lightguide structure that optically couples two lightguide plates 210 adjacent to each other may be provided between these two lightguide plates 210. Such a lightguide structure may be formed by, for example, applying a light-transmissive adhesive on a side surface(s) of the lightguide plate(s) 210 and then curing the adhesive. Alternatively, the lightguide structure may be formed by arranging a plurality of surface-emitting light sources 200 two-dimensionally with predetermined intervals, filling a region between each two adjacent lightguide plates 210 with a light-transmissive resin material, and then curing the resin material. The lightguide structure located between adjacent ones of the lightguide plates 210 may be formed of substantially the same material as that of, for example, the first bonding member 160 described above. It is advantageous that a material having a refractive index higher than, or equal to, that of the material of the lightguide plates 210 is used for a base member of the lightguide structure. The lightguide structure located between adjacent ones of the lightguide plates 210 may have a light diffusion function.

In the case where each of the surface-emitting light sources 200 has a length L in a length direction of about 24.3 mm and a length W in a width direction of about 21.5 mm, the arrangement of the surface-emitting light sources 200 shown in FIG. 9 is suitable to a 15.6-inch screen having an aspect ratio of 16:9. The surface-emitting light source 300 shown in FIG. 9 can be preferably used for, for example, a backlight unit of a laptop personal computer having a 15.6-inch screen.

In this example, a collective plurality of the upper surfaces 210a of the lightguide plates 210, each of the collective plurality of the upper surfaces 210a being the upper surface of a respective one of the surface-emitting light source 200, forms a light emitting surface. Therefore, the number of the surface-emitting light sources 200 included in the surface-emitting light source 300 may be changed, or the positional arrangement of the surface-emitting light sources 200 may be changed, so that the surface-emitting light source 300 can be easily employed for a plurality of types of liquid crystal panels having different screen sizes. That is, the surface-emitting light source 300 can be flexibly made suitable to a change in the screen size without re-performing optical calculations regarding the lightguide plates 210 or the like in the surface-emitting light sources 200 or re-producing a mold to be used to form the lightguide plates 210. Therefore, increase in the production cost or the lead time due to a change in the screen size can be avoided.

Figure 10:
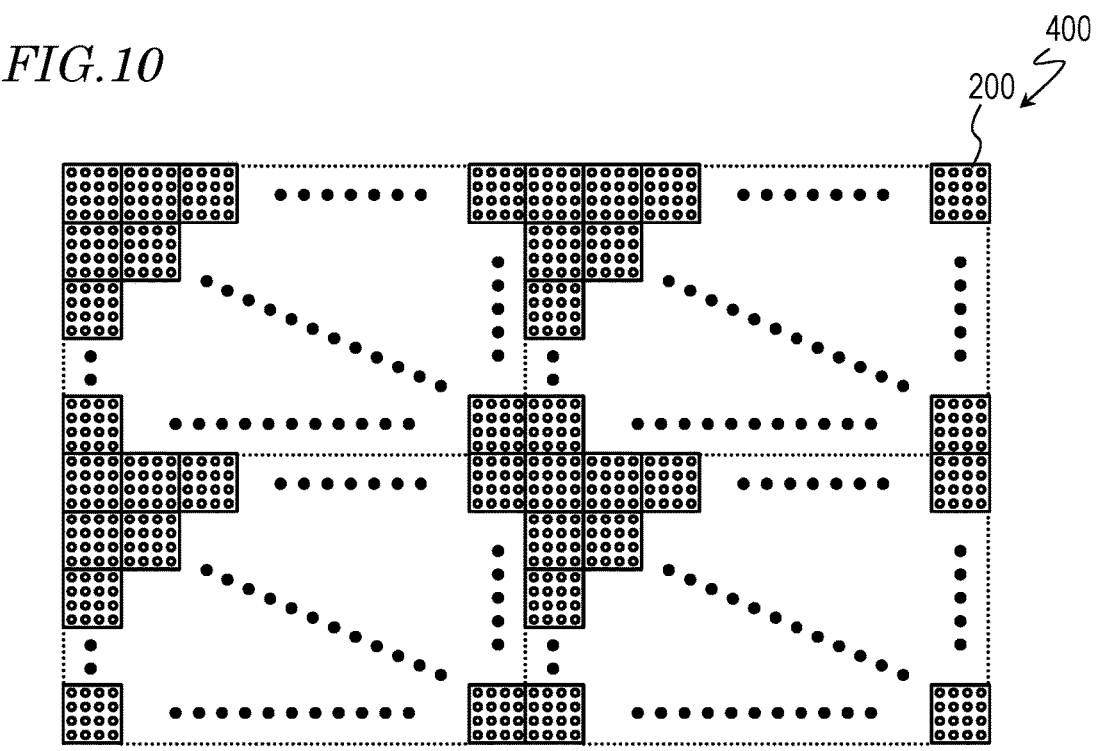
FIG. 10 is a schematic plan view showing a configuration in which a plurality of the two-dimensional arrays of the plurality of surface-emitting light sources shown in FIG. 9 are arranged in two rows and two columns.

FIG. 10 shows a configuration in which a plurality of sets of the surface-emitting light sources 200 (a plurality of the surface-emitting light sources 300) each shown in FIG. 9 are arranged in two rows by two columns. In this case, a total of 512 surface-emitting light sources 200 may form a surface-emitting light source 400 suitable to a 31.2-inch screen having an aspect ratio of 16:9. The arrangement of the surface-emitting light sources 200 shown in FIG. 10 can be employed for, for example, a backlight unit for a liquid crystal TV. Thus, according to this embodiment, a light emitting surface having a larger area may be obtained relatively easily.

According to a technique of combining a plurality of the surface-emitting light sources 200 to increase an area of a light emitting surface, the surface-emitting light sources can be flexibly made suitable to a liquid crystal panel of various sizes without re-performing optical designing or to re-producing a mold to be used to form lightguide plates in accordance with the screen size of the liquid crystal panel. That is, a backlight unit suitable to a screen size may be provided at low cost within a short period of time. In addition, there is an advantage that if a light emitting element does not emit light due to breakage of wire or the like, replacing a surface-emitting light source including the defective light emitting element is enough to recover from the non-lighting.

Figure 11:
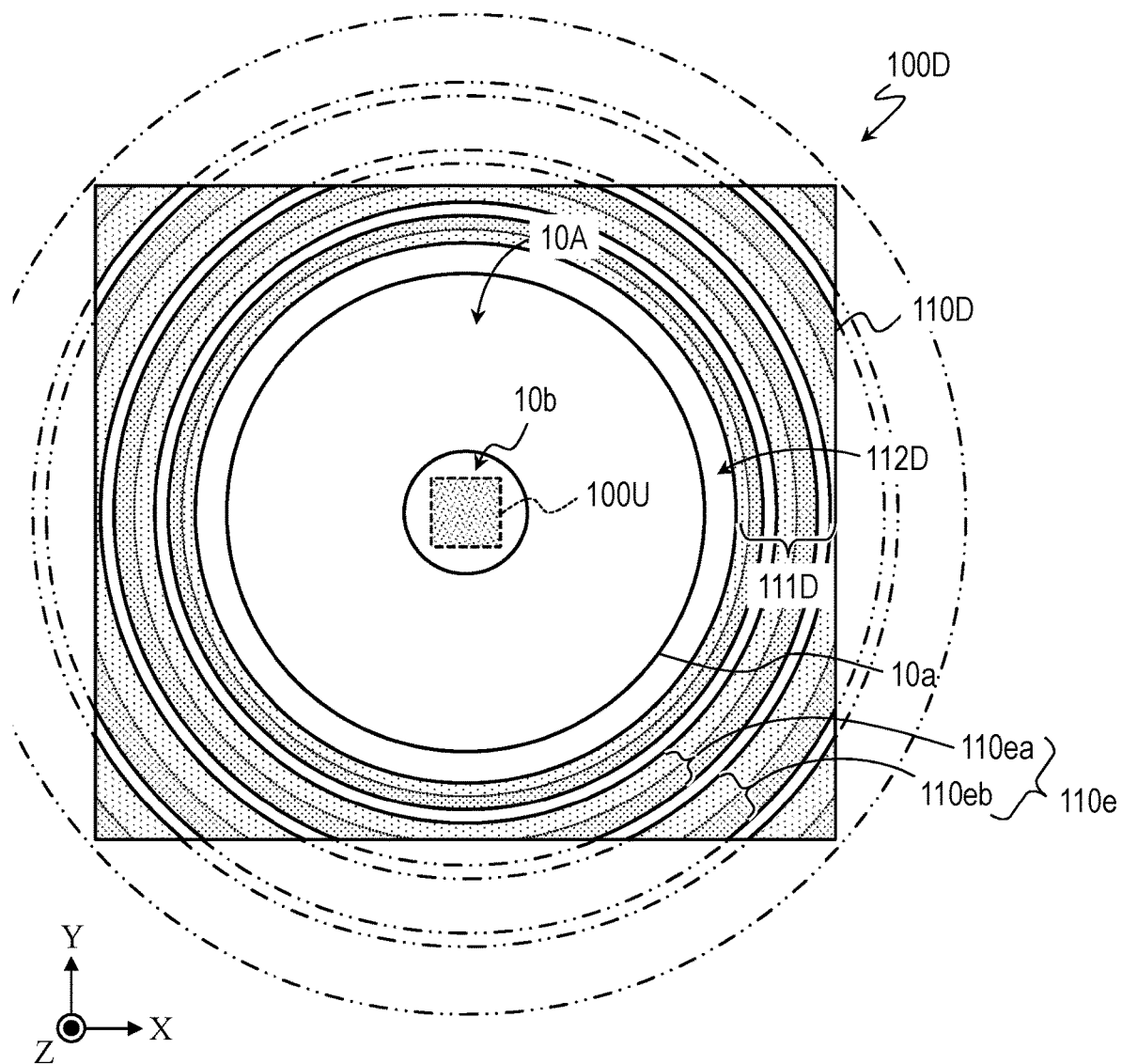
FIG. 11 is a schematic plan view of a light emitting module according to another embodiment of the present disclosure, and shows another example of the plurality of protrusions that may be provided in a first region of the lightguide plate.

FIG. 11 shows a light emitting module 100D according to another embodiment of the present disclosure. As compared with the light emitting module 100A described above with reference to FIG. 2 and the like, the light emitting module 100D shown in FIG. 11 includes a lightguide plate 110D instead of the lightguide plate 110A.

The upper surface 110a of the lightguide plate 110D of the light emitting module 100D shown in FIG. 11 includes a first region 111D and a second region 112D located inward of the first region 111D. A plurality of protrusions 110e are provided in the first region 111D of these two regions. In this example, each of the plurality of protrusions 110e is a protruding ring having an annular shape and formed in the first region 110D of the upper surface 110a. In FIG. 11, the plurality of protrusions 110e are represented by shadings (thinner and darker) for ease of understanding. The lightguide plate 110D has a cross-section approximately the same as that of the lightguide plate 110A shown in an upper part of FIG. 2. Thus, in this example, a cross-sectional view of the light emitting module 100D is not shown.

In the configuration shown in FIG. 11, the plurality of protrusions 110e include a first protruding ring 110ea and a second protruding ring 100eb located outward of the first protruding ring 110ea. The second protruding ring 100eb have a width larger than that of the first protruding ring 110ea. As in the example shown in FIG. 11, the width of the plurality of protruding rings may be increased in an outward direction from the light emitting element 120, so that the ratio of an area occupied by the plurality of protrusions 110e per unit area in a plan view can be increased concentrically in an outward direction from the light emitting element 120. Therefore, as in the case where the plurality of protrusions are arranged in the form of the plurality of dots in the first region, the luminance at a position, far from the light emitting element 120, in the first region 111D may be improved, and an effect of reducing unevenness in luminance can be obtained.

In FIG. 11, the second protruding ring 110eb is shown to have a shape of a portion of a ring. This is because each of the protruding rings is shown larger with exaggeration for the sake of convenience. Any appropriate shape that may be regarded as being an annular shape in consideration of a portion located outward of the upper surface 110a of the lightguide plate (as represented with the two-dot chain lines in FIG. 11) may be considered to be encompassed in the "annular shape" in the present disclosure.

Instead of increasing the width of the annular protrusions in an outward direction from the light emitting element 120, the interval between the plurality of protrusions may be decreased while the width of the annular protrusions is kept the same. With such a configuration, the number density of the protrusions per unit area may be increased. Therefore, the ratio of the area occupied by the plurality of protrusions 110e per unit area in a plan view may increase concentrically. Alternatively, the interval between the plurality of protrusions may be decreased in addition to increase of the width of the annular protrusions.

A plurality of protrusions each having an annular shape and a plurality of protrusions each having dot-like shape may be located in the upper surface 110a in a mixed manner. In other words, the dot-like protrusions may be arranged in addition to the annular protrusions, so that generation of an annular bright-and-dark pattern may be more reduced as compared with the case where only the annular protrusions are provided.

Figure 12:
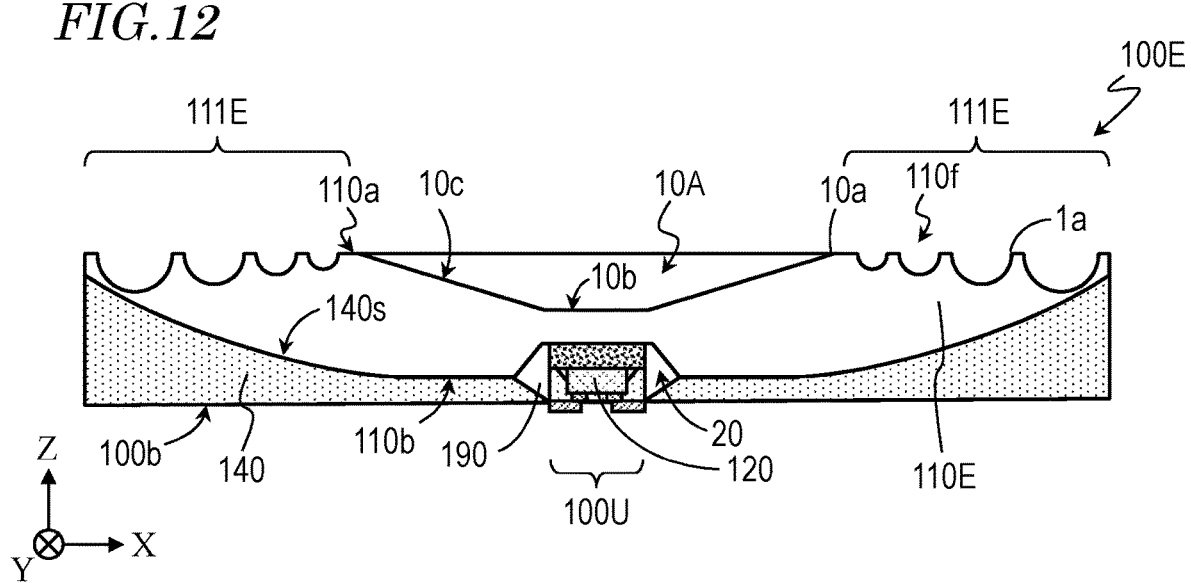
FIG. 12 schematically shows a cross-section of a light emitting module according to still another embodiment of the present disclosure.

FIG. 12 schematically shows a cross-section of a light emitting module 100E according to still another embodiment of the present disclosure. As compared with the light emitting module 100A described above with reference to FIG. 2 and FIG. 3, the light emitting module 100E shown in FIG. 12 includes a lightguide plate 110E instead of the lightguide plate 110A. A main difference between the lightguide plate 110A and the lightguide plate 110E is that a plurality of recesses 110f, instead of the plurality of protrusions 110d, are defined in a first region 111E of the upper surface 110a of the lightguide plate 110E. As schematically shown in FIG. 12, the plurality of recesses 110f have shapes such that, for example, a size of openings 1a of the plurality of recesses 110f increases in an outward direction from the light emitting element 120. In FIG. 12, the plurality of recesses 110f are shown larger with exaggeration for the sake of convenience.

The plurality of recesses 110f defined in the first region 111E may be, for example, a plurality of dots. The term "dot" as used herein generally refers to a structure having a circular shape represented by a circle or an ellipse in a plan view. In this specification, the term "dot" is construed as encompassing both of a shape protruding from the upper surface 110a of the lightguide plate and a shape recessed from the upper surface 110a. In the configuration shown in FIG. 12, the plurality of recesses 110f are recessed toward the lower surface 110b side of the lightguide plate 110E from the upper surface 110a.

The plurality of recesses 110f may have a shape obtained by inverting the plurality of protrusions 110d, described above with reference to FIG. 2, FIG. 5 and FIG. 6, with respect to the upper surface 110a. Each of the plurality of recesses 110f can be a dot-like recess having, for example, a circular opening 1a in a plan view. In this example, as in the example shown in FIG. 2, the first region 111E occupies the entire region of the upper surface 110a that does not overlap the first hole 10A, and the ratio of the area occupied by the recesses 110f per unit area in the first region 111E in a plan view increases concentrically in an outward direction from the light emitting element 120.

As described above, also in the case where the plurality of recesses 110f are located in the first region 111E, as in the case where the plurality of protrusions 110d are located, the luminance of the upper surface 110a can be improved in accordance with the ratio of the area occupied by the recesses 110f per unit area. As in the example shown in FIG. 5, a second region in which no recesses 110f are defined may be present between imaginary circle R1 and the opening 1a of the first hole 10A. The first region 111E may include an inner region and an outer region, and a plurality of recesses 110f arranged in the outer region may have a diameter greater than that of a plurality of recesses 110f arranged in the inner region.

Instead of, or in addition to, increase of the size of the recesses 110f in an outward direction from the light emitting element 120, the number density of the recesses 110f may be increased in the outward direction from the light emitting element 120 as in the example shown in FIG. 6. The number density of the plurality of recesses 110f in the outer region may be higher than that of the plurality of recesses 110f in the inner region. Also with such a configuration, the ratio of the area occupied by the recesses 110f per unit area can be increased concentrically in an outward direction from the light emitting element 120. Alternatively, a density of arrangement of the plurality of recesses 110f may be increased in an outward direction from the light emitting element 120. For example, the pitch of the plurality of recesses 110f may be decreased in the outward direction from the light emitting element 120.

The plurality of recesses 110f may be formed in the first region of the upper surface 110a in the form of annular grooves. For example, the width of the ring-shaped grooves may be increased in an outward direction from the light emitting element 120, so that the ratio of the area occupied by the plurality of recesses per unit area in a plan view can be increased concentrically in an outward direction from the light emitting element 120. Alternatively, the interval between the plurality of annular recesses may be decreased.

Figure 13:
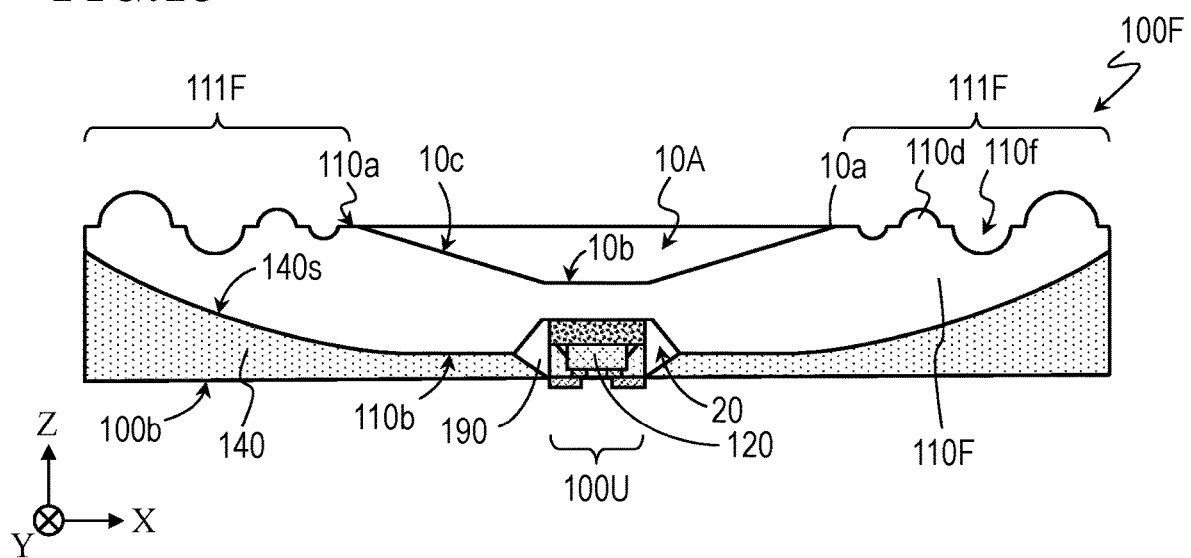
FIG. 13 schematically shows a cross-section of a light emitting module according to yet another embodiment of the present disclosure.

FIG. 13 schematically shows a cross-section of a light emitting module according to yet another embodiment of the present disclosure. The upper surface 110a of a lightguide plate 110F of the light emitting module 100F shown in FIG. 13 includes a first region 111F. In this example, the plurality of protrusions 110d and the plurality of recesses 110f are defined in the first region 111F. In this manner, a plurality of protrusions and a plurality recesses may be present in a mixed manner in the first region. The first region of the upper surface 110a of the lightguide plate may include any of combinations of two or more types selected from a plurality of dot-like protrusions, a plurality of dot-like recesses, a plurality of annular protrusions and a plurality of annular recesses.

As described above, the plurality of protrusions and the plurality of recesses may be present in a mixed manner at the upper surface 110f of the lightguide plate. The lightguide plate 210 of the surface-emitting light source 200 may be formed, for example, of a thermoplastic resin such as polycarbonate or the like using a technique employing a mold such as injection molding or the like. In this case, using a mold defining recesses in a cavity of the mold allows protrusions having a shape conformed to the shape of the recesses in the mold to be easily formed at the surface of the lightguide plate. Therefore, it is more advantageous to form the protrusions at the upper surface 110a of the lightguide plate than to form the recesses, in view of ease of formation.

With a molding method using a mold, the shape and the arrangement of the protrusions protruding into the cavity may be controlled, so that recesses having a desired shape may be formed with high precision at desired positions of the upper surface 210a of the lightguide plate 210 and at desired positions of a lower surface opposite to the upper surface 210a. Therefore, a first hole on the upper surface 210a side of the lightguide plate 210 and a second hole on the lower surface side may be formed such that, for example, centers thereof substantially coincide each other. The light emitting unit 100U may be disposed on the lower surface side of the lightguide plate 210 without provision of the second hole on the lower surface side of the lightguide plate 210.

For a shape of the first hole 10A, any appropriate shapes other than an inverted frustum cone shape as shown in FIG. 2 through FIG. 7 and FIG. 11 through FIG. 13 may be employed, and various shapes including an inverted frustum polygonal pyramid shape, an inverted conical shape without the upward-facing surface 10b, an inverted polygonal pyramid shape without the upward-facing surface 10b, and the like may be employed. The lateral surface 10c may have, for example, a curve shape or a shape including a stepped portion or a bent portion in a cross-sectional view.

Figure 14:
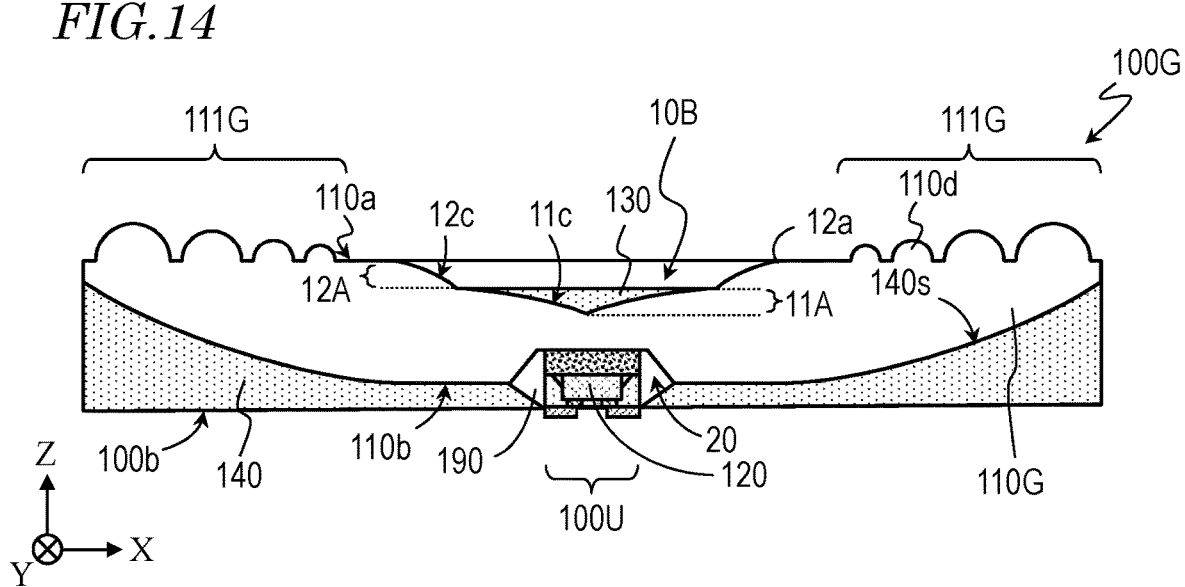
FIG. 14 schematically shows a cross-section of a light emitting module according to even another embodiment of the present disclosure.

As shown in FIG. 14, a first hole 10B including two different portions having side surfaces of different slopes may be employed instead of the first hole 10A. A light emitting module 100G shown in FIG. 14 is an example in which the first hole 10B is formed in the upper surface 110a of a lightguide plate 110G including the plurality of protrusions 110d in a first region 111G.

The first hole 10B includes a first portion 11A having a first lateral surface 11c inclining with respect to the upper surface 110a and a second portion 12A having a second lateral surface 12c inclined with respect to the upper surface 110a. As shown in FIG. 14, the second lateral surface 12c of the second portion 12A is one of one or more lateral surfaces defining the first hole 10B, and is located between an opening 12a located at the upper surface 110a of the lightguide plate 110G and the first side surface 11c of the first portion 11A. The degree of inclination of the first side surface 11c with respect to the upper surface 110a is different from the degree of inclination of the second side surface 12c with respect to the upper surface 110a. In the configuration shown in FIG. 14, the first portion 11A of the first hole 10B has a substantially inverted cone shape, and the second portion 12A has a substantially inverted frustum cone shape.

In this example, a reflective resin layer 130 is disposed in the first portion 11A of the first hole 10B. The reflective resin layer 130 is formed of, for example, a material substantially the same as that of the first light-reflective member 140 or the second light-reflective member 170, and is light-reflective. With the reflective resin layer 130 located above the light emitting element 120, light emitted from the light emitting element 120 and advancing toward the center or in the vicinity thereof of the upper surface 110a of the lightguide plate 110G may be reflected by the reflective resin layer 130. Therefore, the light emitted from the light emitting element 120 may be efficiently diffused in a plane of the lightguide plate 110G. In addition, an excessive local increase in luminance of a region of the upper surface 110a of the lightguide plate 110G directly above the light emitting element 120 may be reduced. It is not necessary that the reflective resin layer 130 completely blocks the light from the light emitting element 120. The reflective resin layer 130 may have a semi-transmissive property, which is a property to transmit a portion of the light emitted from the light emitting element 120.

In embodiments of the present disclosure, it is not necessary that the first portion 11A of the first hole 10B is entirely filled with the reflective resin layer 130. The reflective resin layer 130 occupy at least a part of the first portion 11A. For example, the reflective resin layer 130 may be formed in the first hole 10B so as to cover the first side surface 11c of the first portion 11A. The reflective resin layer 130 may be omitted.

Figure 15:
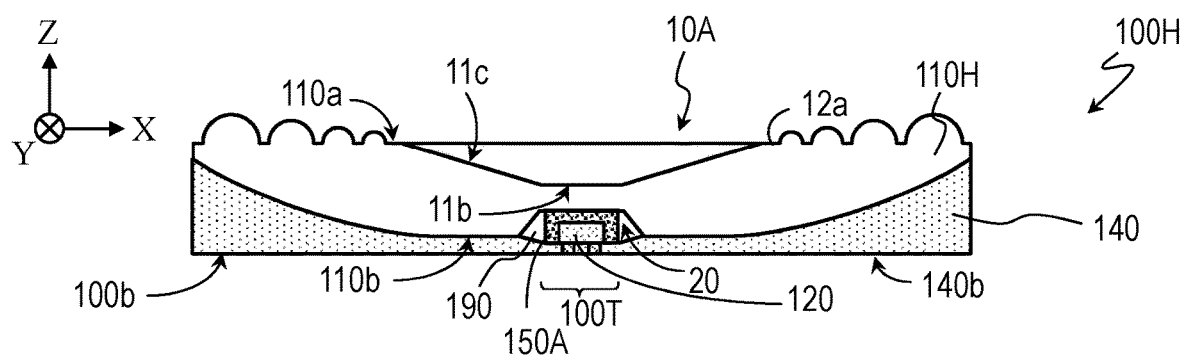
FIG. 15 schematically shows a cross-section of a light emitting module according to further another embodiment of the present disclosure.
Figure 16:
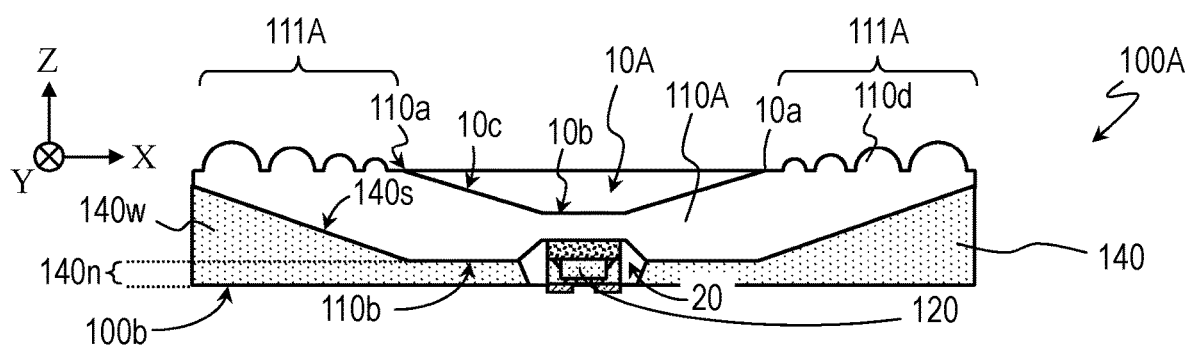
FIG. 16 schematically shows a cross-section of a light emitting module according to further another embodiment of the present disclosure.

FIG. 15 schematically shows a cross-section of a light emitting module according to further another embodiment of the present disclosure. The light emitting module 100H shown in FIG. 15 includes a lightguide plate 100H and a light emitting unit 100T including the light emitting element 120 and a wavelength conversion member 150A. As schematically shown in FIG. 15, the light emitting unit 100T is arranged on a downward-facing surface defining the second hole 20 of the lightguide plate 110H via the second bonding member 190.

In this example, the wavelength conversion member 150A covers the upper surface 120a of the light emitting element 120 and also covers a side surface of the main body 122 (see, FIG. 3). The wavelength conversion member may have a shape other than a plate-like shape, and may have a shape also covering the side surface of the light emitting element 120. In this example, the first light-reflective member 140 covers a portion of the wavelength conversion member 150A and a portion of the light emitting element 120 that are located on the side opposite to the upper surface 110a of the lightguide plate 110H. Meanwhile, the lower surfaces of the electrodes 124 of the light emitting element 120 are exposed from the lower surface 140b of the first light-reflective member 140 on the lower surface 100b side of the light emitting module 100H. Such a configuration allows for reducing leakage, from the lower surface 140b, of light advancing from the light emitting element 120 toward the lower surface 100b side of the light emitting module 100H.

A light emitting module and a surface-emitting light source according to embodiments of the present disclosure applicable to various types of light sources for lighting, on-vehicle light sources, display light sources, etc. In particular, the light emitting module and the surface-emitting light source are advantageously applicable to backlight units for liquid crystal display devices. The light emitting module and the surface-emitting light source according to embodiments of the present disclosure is preferably applicable in backlight units for display devices of mobile apparatuses, for which there are strong demands for reducing the thickness, in surface-emitting devices that are capable of performing local dimming control, and the like.

While certain embodiments of the present invention has been described with respect to exemplary embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A light emitting module, comprising:
   a lightguide plate having an upper surface and a lower surface opposite to the upper surface,
   a light emitting element on a lower surface side of the lightguide plate,
   wherein the upper surface of the lightguide plate includes a first region including a plurality of protrusions,
   wherein the lower surface of the lightguide plate includes a curved slope portion or a straight-line slope portion surrounding the light emitting element,
   wherein a first hole is defined in the upper surface of the lightguide plate, the first hole facing the light emitting element,
   wherein the upper surface of the lightguide plate further includes a second region formed of an annular flat surface surrounding the first hole, and
   wherein the first region is located outward of the second region and surrounds the second region.

2. The light emitting module of claim 1,
   wherein the first region includes:
   an outer region, and
   an inner region located closer to the light emitting element than the outer region, and wherein protrusions arranged in the outer region have a number density higher than that of protrusions arranged in the inner region.

3. The light emitting module of claim 1, wherein the plurality of protrusions have a number density that increases in an outward direction from the light emitting element.

4. The light emitting module of claim 1, wherein the plurality of protrusions include a first protrusion and a second protrusion which is farther from the light emitting element than is the first protrusion, and
the second protrusion has a size larger than that of the first protrusion in a plan view.

5. The light emitting module of claim 1, wherein the plurality of protrusions are arranged with a pitch that decreases in the outward direction from the light emitting element.

6. A light emitting module, comprising:
a lightguide plate having an upper surface and a lower surface opposite to the upper surface,
a light emitting element on a lower surface side of the lightguide plate,
wherein the upper surface of the lightguide plate includes a first region including a plurality of protrusions,
wherein the lower surface of the lightguide plate includes a curved slope portion or a straight-line slope portion surrounding the light emitting element,
wherein a first hole is defined in the upper surface of the lightguide plate, the first hole facing the light emitting element,
wherein a second hole is defined in the lower surface of the lightguide plate, the second hole located at a position facing the first hole, and
wherein the light emitting element is disposed in the second hole in a plan view.

7. The light emitting module of claim 6, further comprising a wavelength conversion member disposed in the second hole, the wavelength conversion member located between the light emitting element and the lightguide plate.

8. The light emitting module of claim 1,
wherein the light emitting element includes an electrode on a side opposite to the lightguide plate, and
wherein the light emitting module further includes a light-reflective member that covers at least a portion of the lower surface of the lightguide plate.

9. A light emitting module, comprising:
a lightguide plate having an upper surface and a lower surface opposite to the upper surface,
a light emitting element on a lower surface side of the lightguide plate,
wherein the upper surface of the lightguide plate includes a first region including a plurality of recesses,
wherein the lower surface of the lightguide plate includes a curved slope portion or a straight-line slope portion surrounding the light emitting element,
wherein the plurality of recesses include a first recess and a second recess that is farther from the light emitting element than is the first recess, and
wherein the second recess has a size larger than that of the first recess in a plan view.

10. The light emitting module of claim 9,
wherein the first region includes:
an outer region, and
an inner region located closer to the light emitting element than the outer region, and
wherein recesses arranged in the outer region have a number density higher than that of recesses arranged in the inner region.

11. The light emitting module of claim 9, wherein the plurality of recesses have a number density that increases in an outward direction from the light emitting element.

12. A light emitting module, comprising:
a lightguide plate having an upper surface and a lower surface opposite to the upper surface,
a light emitting element on a lower surface side of the lightguide plate,
wherein the upper surface of the lightguide plate includes a first region including a plurality of recesses,
wherein the lower surface of the lightguide plate includes a curved slope portion or a straight-line slope portion surrounding the light emitting element,
wherein a first hole is defined in the upper surface of the lightguide plate, the first hole facing the light emitting element,
wherein the upper surface of the lightguide plate further includes a second region formed of an annular flat surface surrounding the first hole, and
wherein the first region is located outward of the second region and surrounds the second region.

13. The light emitting module of claim 9, wherein the plurality of recesses are arranged with a pitch that decreases in the outward direction from the light emitting element.

14. The light emitting module of claim 12,
wherein a second hole is defined in the lower surface of the lightguide plate, the second hole located at a position facing the first hole, and
wherein the light emitting element is disposed in the second hole in a plan view.

15. The light emitting module of claim 14, further comprising a wavelength conversion member disposed in the second hole, the wavelength conversion member located between the light emitting element and the lightguide plate.

16. The light emitting module of claim 9,
wherein the light emitting element includes an electrode on a side opposite to the lightguide plate, and
wherein the light emitting module further includes a light-reflective member that covers at least a portion of the lower surface of the lightguide plate.

* * * * *